(12) United States Patent
Nakamura et al.

(10) Patent No.: US 6,482,079 B1
(45) Date of Patent: Nov. 19, 2002

(54) METHOD AND APPARATUS FOR MANUFACTURING FOODSTUFFS SUCH AS SAUSAGES

(75) Inventors: Minoru Nakamura, Yokohama (JP); Minoru Kasai, Yokohama (JP); Chiyoji Shibata, Yokohama (JP); Hideaki Arai, Yokohama (JP)

(73) Assignee: Hitec Co., Ltd., Kanagawa (JP)

( * ) Notice: Subject to any disclaimer, the term of this patent is extended or adjusted under 35 U.S.C. 154(b) by 130 days.

(21) Appl. No.: 09/636,550

(22) Filed: Aug. 11, 2000

(30) Foreign Application Priority Data

Aug. 16, 1999  (JP) ............................................. 11-230141

(51) Int. Cl.[7] ............................................... A22C 11/10
(52) U.S. Cl. .......................................... 452/47; 452/46
(58) Field of Search ............................... 452/47, 46, 48

(56) References Cited

U.S. PATENT DOCUMENTS

| | | |
|---|---|---|
| 1,866,497 A | 7/1932 | Allen et al. |
| 3,435,482 A | 4/1969 | Ziolko |
| 4,322,871 A | 4/1982 | Townsend et al. |
| 4,418,447 A | 12/1983 | Ziolko |
| 4,420,856 A | 12/1983 | Ziolko |
| 4,463,477 A | 8/1984 | Ziolko |
| 4,549,330 A | 10/1985 | Ziolko |
| 4,671,042 A | 6/1987 | Moekle et al. |
| 4,905,349 A | 3/1990 | Townsend |
| 5,156,566 A | 10/1992 | Righele |
| 5,480,346 A * | 1/1996 | Kasai et al. ................... 452/47 |
| 5,709,600 A | 1/1998 | Xie et al. |
| 5,788,563 A * | 8/1998 | Nakamura et al. ............. 452/47 |
| 6,050,888 A * | 4/2000 | Nakamura et al. ............. 452/47 |

FOREIGN PATENT DOCUMENTS

| | | |
|---|---|---|
| DE | 3519021 A1 * | 11/1986 |
| GB | 2 143 113 A | 2/1985 |
| GB | 2 299 742 B | 10/1996 |
| JP | 49-101577 | 9/1974 |
| JP | 58-9645 | 1/1983 |
| JP | 59-102597 | 6/1984 |
| JP | 363281971 A * | 11/1988 |
| JP | 3-58876 | 9/1991 |
| JP | 3-75129 | 11/1991 |
| JP | 4-223900 | 8/1992 |
| JP | 8-256675 | 10/1996 |
| WO | WO99/53770 | 10/1999 |

OTHER PUBLICATIONS

FAMCO Catalogue U.S. Apr. 1990 Automatic Sausage Linkers.

* cited by examiner

Primary Examiner—Peter M. Poon
Assistant Examiner—F. Copier
(74) Attorney, Agent, or Firm—Nixon & Vanderhye

(57) ABSTRACT

An apparatus for manufacturing foodstuffs such as sausages includes: a stuffed-casing forming and rotating device for forming a stuffed casing by discharging meat emulsion or ground meat as a stuffing material into an unstuffed casing formed of a natural intestine, and for rotating the stuffed casing via the unstuffed casing in a direction R about an axis X; a stuffed-casing constriction-forming and conveying device for producing a twisted portion in the stuffed casing by causing the stuffed casing formed by the stuffed-casing forming and rotating device and rotating in the direction R to be consecutively squeezed and constricted at a predetermined interval, and for conveying the stuffed casing, in which the twisted portion has occurred, in a direction A; and a cutting device for consecutively separating at the twisted portions the stuffed casing which has been formed by the stuffed-casing constriction-forming and conveying device.

23 Claims, 21 Drawing Sheets

METHOD AND APPARATUS FOR MANUFACTURING FOODSTUFFS SUCH AS SAUSAGES

BACKGROUND OF THE INVENTION

1. Field of the Invention

The present invention relates to a method and an apparatus for manufacturing foodstuffs such as sausages in which twisted portions of a chain-like stuffed casing with a sausage material or the like stuffed therein and the twisted portions formed therein are cut to separate the sausages or the like from each other at the twisted portions.

2. Description of the Related Art

Raw sausages among sausages, for example, are separated from each other at their chain-like constricted portions and are formed into products before heating and cooking. As this type of an apparatus for manufacturing raw sausages, as disclosed in JP-A-8-256675 filed by the present assignee, an apparatus has been proposed wherein a pair of opposing pincher members have squeezing surfaces for squeezing the stuffed casing, and a constricted portion of the stuffed casing constricted by the pair of pincher members is cut by a blade attached to the pincher member.

As for this proposed apparatus, it is difficult to say that the squeezing surfaces of the pincher members are suitable for cutting the constricted portions of sausages of a type which is difficult to cut. Namely, in this apparatus, since the constricted portion located between the recessed and projecting pinchers with an interval formed therebetween is cut by the blade, in the case of natural intestine casings whose constricted portions are likely to become elongated and stuffed casings whose stuffing density is low, the constricted portion becomes elongated and escapes due to the pressing of the constricted portion by the blade, so that there are cases where the constricted portion cannot be cut completely. In addition, in a stuffed casing containing a low-fluidity stuffing material, there are cases where the stuffing material remains at the constricted portion constricted by the pincher members, and the stuffing material becomes exposed at the cut constricted portion.

Furthermore, in the case of a stuffed natural intestine casing having a large curve in terms of its shape, e.g., a pig's intestine casing, a twist is likely to occur at that portion of the stuffed natural intestine casing which has not been squeezed by the pincher members, and there are cases where the twist at the cut portion becomes insufficient, exposing the stuffed material from the twisted portion which has been cut.

In addition to the above-described apparatus, an apparatus disclosed in U.S. Pat. No. 5,709,600 is also known. This apparatus has a pair of pincher members on which flat surfaces for constricting the stuffed casing are formed, and a slot of a cutting blade is formed in one of the two flat surfaces. In this apparatus, since the stuffed casing is constricted by causing the two flat surfaces to abut against each other, the timing of generating a twist is delayed, and a twist is difficult to occur in the stuffed casing squeezed by the flat surfaces. Further, there is the possibility of the stuffed casing entering the slot, and a twisted portion in which the material remains can be possibly formed. Still further, since the cutting blade of this apparatus does not enter the inner side of the other surface abutting against one flat surface in which the slot is formed, there is the possibility that that portion of the twisted portion which is located at the position of contact with the other surface cannot be cut completely.

SUMMARY OF THE INVENTION

The present invention has been devised in view of the above-described aspects, and it is an object of the invention to provide a method and an apparatus for manufacturing foodstuffs such as sausages which, even in the case of sausages using a natural intestine casing whose extensibility is noticeable and sausages whose stuffing density is low, make it possible to reliably cut the twisted portions without an error.

Another object of the invention is to provide a method and an apparatus for manufacturing foodstuffs such as sausages which, even in the case of sausages of a low-fluidity stuffing material, make it possible to eliminate the sufficing material from the constricted portions and hence accurately produce at a cutting position the twisted portions in which the stuffing material practically does not remain, thereby making it possible to more reliably cut the twisted portions without an error.

Still another object of the invention is to provide a method and an apparatus for manufacturing foodstuffs such as sausages, including natural intestine sausages, which make it possible to form twisted portions in a desired number of twists in the stuffed natural intestine casing having a curved shape, and make it possible to form separated twisted portions excelling in the appearance.

In accordance with a first aspect of the present invention, there is provided a method of manufacturing foodstuffs such as sausages, comprising the steps of: forming a stuffed casing and rotating the stuffed casing; forming a twisted portion in the stuffed casing by squeezing and constricting the rotating stuffed casing at a predetermined interval and conveying the stuffed casing; clamping the twisted portion at at least two positions spaced apart in a conveying direction; and cutting the twisted portion located between the two positions of the clamped twisted portion.

In accordance with a second aspect of the present invention, there is provided an apparatus for manufacturing foodstuffs such as sausages, comprising: stuffed-casing forming and rotating means for forming a stuffed casing and rotating the stuffed casing; stuffed-casing constriction-forming and conveying means for forming a twisted portion in the stuffed casing by squeezing and constricting up to a predetermined interval the stuffed casing being formed and rotated by the stuffed-casing forming and rotating means and for conveying the stuffed casing; clamping means for clamping the twisted portion at at least two positions spaced apart in a conveying direction; and cutting means for cutting the twisted portion located between the two positions of the twisted portion clamped by the clamping means.

In accordance with a third aspect of the present invention, there is provided an apparatus for manufacturing foodstuffs such as sausages, comprising: stuffed-casing forming and rotating means for forming a stuffed casing and rotating the stuffed casing; a pair of endless members for forming a conveying area for conveying the stuffed casing; pincher members attached to one of the endless members at predetermined intervals and each having a recessed surface; clamping members attached to another one of the endless members at the predetermined intervals and each having a projecting surface which moves while being fitted in a recessed surface of the pincher member so as to produce in the conveying area an interval with the recessed surface of the pincher member; stuffed-casing rotating means for rotating the stuffed casing; cutting means each having a cutting blade and moving means provided swingably on the pincher member and adapted to move the cutting blade toward the clamping member; and surface pushing means for relatively pushing out the projecting surface of the clamping member with respect to the recessed surface of the pincher member so as to reduce a face-to-face interval between the recessed surface and the projecting surface opposing and fitted in the recessed surface.

In accordance with a fourth aspect of the present invention, there is provided a method of manufacturing foodstuffs such as sausages, comprising the steps of: forming a stuffed casing and rotating the stuffed casing; moving a pair of endless members in a conveying area formed by the pair of endless members to convey the stuffed casing; causing a recessed surface of a pincher member attached to one of the pair of endless members to be fitted to a projecting surface of a clamping member attached to another one of the pair of endless members, and squeezing and constricting the stuffed casing located between the recessed surface and the projecting surface; twisting the constricted stuffed casing located between the recessed surface of the pincher member and the projecting surface of the clamping member opposing each other with a face-to-face interval in an upstream-side conveying area; reducing the face-to-face interval between the recessed surface of the pincher member and the projecting surface of the clamping member which move from an upstream-side conveying area toward a downstream-side conveying area; causing the recessed surface of the pincher member and the projecting surface of the clamping member to clamp the twisted casing in cooperation with each other; and cutting in the downstream-side conveying area the twisted casing being clamped by moving a cutting blade provided on the pincher member toward a space between two clamping surfaces formed on the clamping member and spaced apart in a conveying direction.

The present invention is applicable to the manufacture of sausages using natural intestine casings, such as pig's intestine casings or sheep casings, as well as sausages using artificial casings, such as cellulose casings or collagen casings. In addition, the present invention is also applicable to the manufacture of foodstuffs such as sausages in which a desired number of products are linked together by jointly using pincher members not provided with the cutting blades.

The above and other objects, features and advantages of the present invention will become more apparent from the following detailed description of the invention when read in conjunction with the accompanying drawings.

DESCRIPTION OF THE PREFERRED EMBODIMENTS

Figure 1:
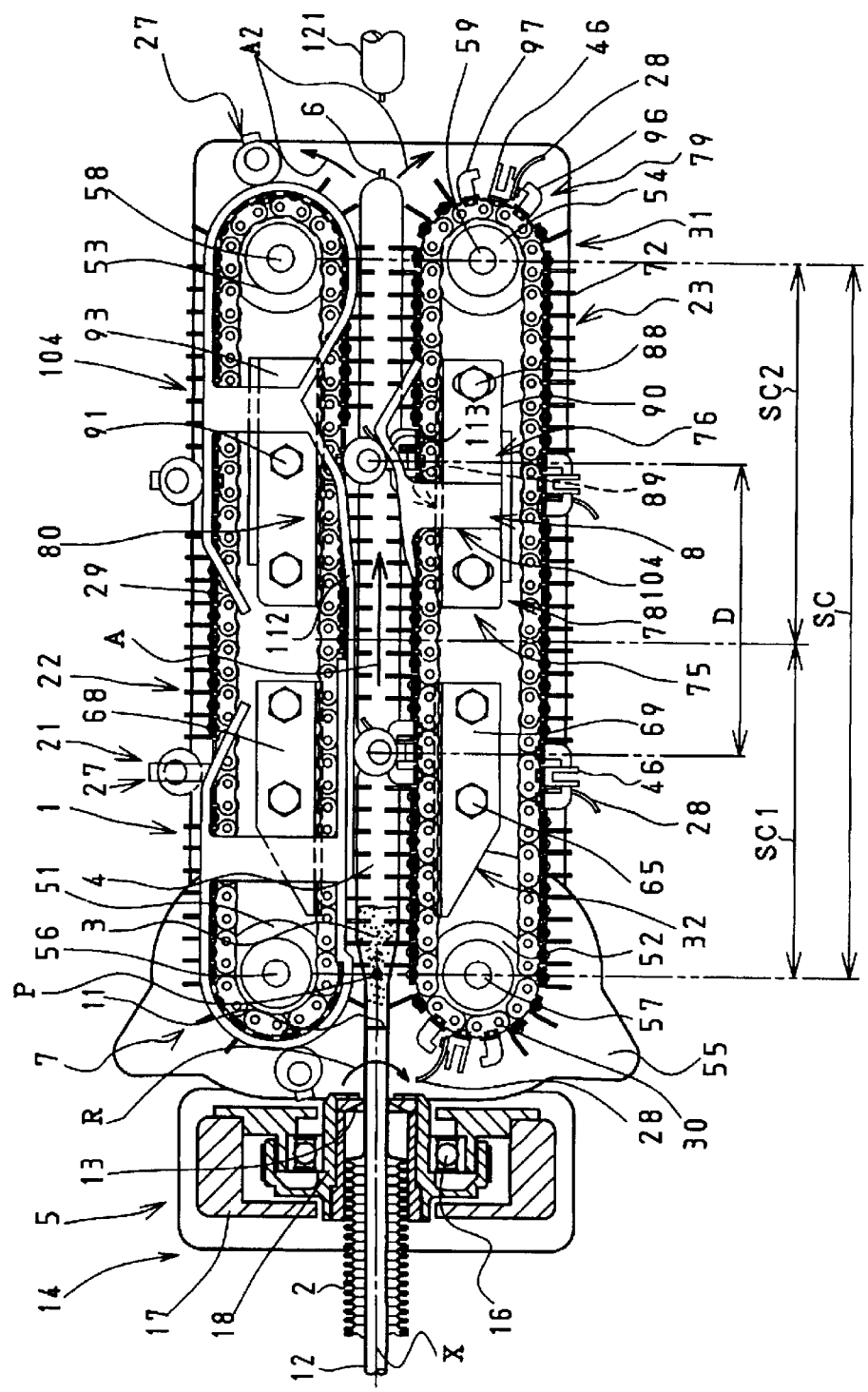
FIG. 1 is an explanatory plan view of an apparatus for manufacturing foodstuffs such as sausages in accordance with a preferred embodiment of the invention.

Referring now to the accompanying drawings which illustrate a preferred embodiment of the invention, a detailed description will be given of the embodiment of the present invention. It should be noted that the present invention is not limited to the embodiment.

FIGS. 1 to 11, an apparatus 1 for manufacturing foodstuffs such as sausages in this embodiment is comprised of a stuffed-casing forming and rotating means 5 for forming a stuffed casing 4 by discharging meat emulsion or ground meat 3, serving as a stuffing material, into an unstuffed casing 2 formed of a natural intestine, and for rotating the stuffed casing 4 about an axis X in a direction R through the unstuffed casing 2; a stuffed-casing constriction-forming and conveying means 7 for consecutively constricting the stuffed casing 4 formed by the stuffed-casing forming and rotating means 5 and rotating in the direction R to produce twisted portions 6 (see FIGS. 5 and 6, in particular) in the stuffed casing, and for conveying the stuffed casing 4 where the twisted portions 6 have occurred in a direction A; and a separating means 8 for consecutively separating at the twisted portions 6 the stuffed casing 4 formed by the stuffed-casing constriction-forming and conveying means 7.

The stuffed-casing forming and rotating means 5 includes a stuffing tube 12 over which the unstuffed casing 2 is fitted and which has a discharge end 11 from which the stuffing material is discharged into the unstuffed casing 2 to form the stuffed casing 4; an annular plate 13 formed of a resilient member such as rubber and serving as a braking member for braking the transfer of the unstuffed casing 2 toward the discharge end 11 as its inner peripheral surface comes into contact with an outer surface of the unstuffed casing 2 fitted over the stuffing tube 12; a stuffed-casing rotating means 14 for rotating the annular plate 13 and the stuffing tube 12 in the direction R to rotate the stuffed casing 4 similarly in the direction R through the unstuffed casing 2; and a stuffing-material supplying mechanism 190 including a pump and the like for supplying the meat emulsion or ground meat 3 into the stuffing tube 12.

The annular plate 13 whose inner peripheral surface comes into contact with the outer surface of the unstuffed casing 2 is secured to a pulley 18 which is supported by a housing 17 through a bearing 16 in such a manner as to be rotatable in the direction R. The stuffing tube 12 is passed through the annular plate 13 extends in and outside the housing 17 through the annular plate 13.

The stuffed-casing constriction-forming and conveying means 7 has a squeezing means 21 for squeezing and constricting the stuffed casing 4, which is rotating in the direction R, consecutively at predetermined intervals D, and a circulatingly moving means 22 for circulatingly moving the squeezing means 21.

The squeezing means 21 includes at least one pair, six pairs in this embodiment, of pincher members 27 and 28 respectively having recessed surfaces 25 and 26, as well as an ensuring means 32 for ensuring the squeezing of the stuffed casing 4 by the respective pairs of pincher members 27 and 28. The circulatingly moving means 22 includes a pair of chains 29 and 30 serving as a pair of endless members, as well as a moving means 31 for circulatingly moving the pair of chains 29 and 30 in synchronism with each other (see FIG. 14). The moving means 31 includes sprockets 51, 52, 53, and 54, a mechanism for rotating the sprockets 51 and 52, shafts 56, 57, 58, and 59, and gears 60 and 61. The pair of endless members form a conveying area SC for conveying the stuffed casing, and the conveying area SC includes a constriction-forming and conveying area SC1 and a cutting operation area SC2.

Each pincher member 27 has a pincher body 36 attached to the chain 29 by means of a bolt 35 (the pincher bodies 36 being attached to the chain 29 at the intervals D) and a pincher piece 39 attached to the pincher body 36 by a bolt 38 while forming a gap 37 with respect to the pincher body 36. The recessed surface 25 of each pincher member 27 includes a recessed surface 40 formed on the pincher body 36 and having a substantially trapezoidal shape, as well as a recessed surface 41 formed on the pincher piece 39 and similarly having a substantially trapezoidal shape.

Meanwhile, each pincher member 28 is attached to a clamping member 46, which will be described later, by a bolt 45. The pincher members 28 are attached to the chain 30 via the clamping members 46 at the intervals D in the same way as the pincher members 27, so that the pincher member 28 precedes in the conveying direction A of the stuffed casing 4 the corresponding pincher member 27 attached to the chain 29. The recessed surface 26 of each pincher member 28 has a substantially V-shaped form.

Each pair of the pincher member 28 and the pincher body 36 of the pincher member 27, which are made to travel in the direction A in synchronism with each other by the chains 29 and 30, are adapted to squeeze and constrict the stuffed casing 4 rotating in the direction R from both sides by the recessed surface 26 and the recessed surface 40 which follows the recessed surface 26 in the conveying direction A, and are adapted to conveying the stuffed casing 4 at these constricted portions in the direction A.

Figure 5:
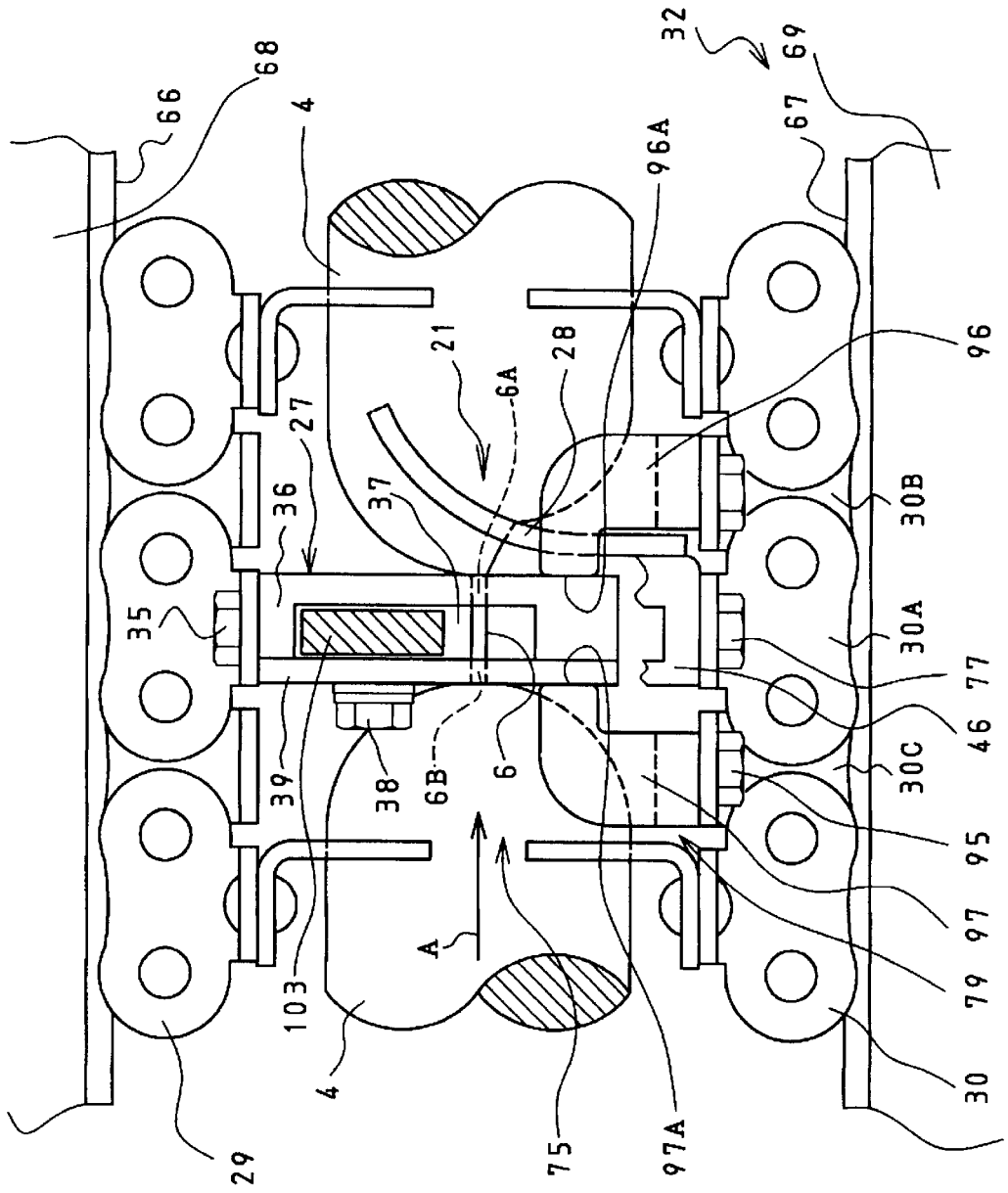
FIG. 5 is an explanatory plan view principally illustrating pincher members and an aligning means of the embodiment shown in FIG. 1.
Figure 6:
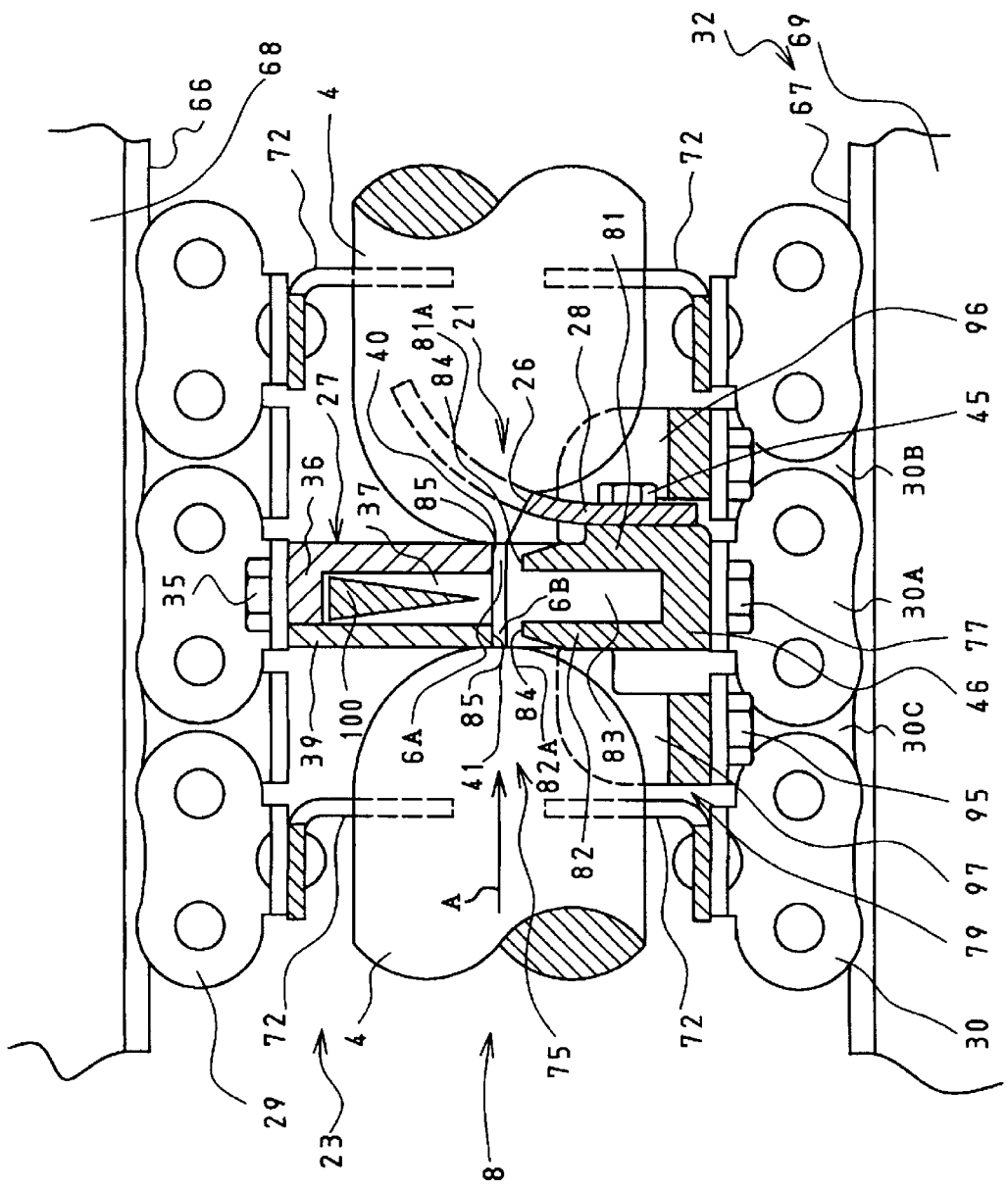
FIG. 6 is an explanatory plan cross-sectional view principally illustrating pincher members and a clamping member of the embodiment shown in FIG. 1.

In this squeezing, as particularly shown in FIGS. 5 and 6, the preceding pincher member 28 is adapted to squeeze and constrict the stuffed casing 4 at its recessed surface 26, while the pincher body 36 of the pincher member 27 following the pincher member 28 is adapted to squeeze and constrict the stuffed casing 4 at its recessed surface 40. By virtue of the preceding characteristic of the pincher member 28 with respect to the pincher body 36, it is possible to produce the twisted portion 6 immediately following the position squeezed and constricted by the pincher member 28, and it is possible to form at a substantially fixed position the twisted portion 6 in which the meat emulsion or ground meat 3 practically does not remain.

It should be noted that, in this embodiment, each pincher member 28 toward its distal end is curved in the conveying direction A. As a result, the pincher member 28 is able to avoid collision with the opposing pincher member 27 during the movement of the pincher member 28 in a direction A1 toward the constriction-forming and conveying area SC1 and during the movement in a direction A2 away from the cutting operation area SC2.

The ensuring means 32 has a pair of sliding plates 68 and 69 which are respectively attached to a base 55 by bolts and whose respective one edges 66 and 67 are relatively slidably brought into contact with the chains 29 and 30. The securing means 32 ensures the squeezing of the stuffed casing 4 by the pairs of pincher members 27 and 28 at a predetermined position.

In the pair of the pincher member 27 and the clamping member 46 which are moving in the constriction-forming and conveying area SC1, the clamping member 46 is fitted in the pincher member 27 such that a projecting surface 81A of the clamping member 46 and the recessed surface 25 of the pincher member 27 oppose each other with an interval O therebetween. This interval O between the opposing surfaces ensures that the twisted portion 6 is positively formed between the clamping member 46 and the pincher member 27 (see FIG. 7).

As described above, the stuffed-casing constriction-forming and conveying means 7 has two recessed surfaces 26 and 40 for constricting the stuffed casing 4 by squeezing the stuffed casing 4 in cooperation with each other, i.e., the recessed surface 26 which precedes in the conveying direction A of the stuffed casing 4 and the recessed surface 40 which follows the recessed surface 26 in the conveying direction A of the stuffed casing 4.

The separating means 8 includes a clamping means 75 which clamps the twisted portion 6 at its two positions 6A and 6B spaced apart in the conveying direction A from both sides in directions perpendicular to the conveying direction A in cooperation with the pincher member 27 of the stuffed-casing constriction-forming and conveying means 7 at the time of separating the stuffed casing 4 at the twisted portion 6; a cutting means 76 for cutting the twisted portion 6 located between the two positions clamped by the clamping means 75; and a holding means 23 for holding the stuffed casing 4 by coming into contact with the outer surface of the stuffed casing 4 being conveyed in the direction A.

The clamping means 75 includes the six clamping members 46 attached to the chain 30 at the intervals D by bolts 77 so as to be conveyed in conjunction with the conveying of the stuffed casing 4 in the direction A by the stuffed-casing constriction-forming and conveying means 7; a surface pushing means 78 for pushing out each clamping member 46 in the cutting operation area SC2 toward the twisted portion 6 of the stuffed casing 4, i.e., in a direction B; a clamping-force securing means 80 for securing the clamping force by the clamping member 46 by accepting the pressing force of the clamping member 46 pushed out by the surface pushing means 78; and an aligning means 79 for aligning the positions of the pincher member 27 and the clamping member 46 in the conveying direction A.

Each clamping member 46 is formed by a bifurcated member which has substantially trapezoidal projecting portions 81 and 82 spaced apart in the conveying direction A as well as projecting surfaces 81A and 82A respectively formed on the projecting portions 81 and 82, and in which a space 83 is formed between the projecting portions 81 and 82. The two projecting surfaces 81A and 82A have projecting surfaces complementary to the recessed surfaces 40 and 41 of the pincher member 27. As particularly shown in FIGS. 7 to 9, the clamping member 46 is adapted to cause respective apex portions 84 of the two projecting portions 81 and 82 to press the twisted portion 6 at the two positions 6A and 6B against respective bottom portions 85 of the recessed surfaces 40 and 41 of the pincher member 27 such that its two projecting surfaces 81A and 82A are fitted in the recessed surfaces 40 and 41, thereby clamping the twisted portion 6 at the two positions. Namely, the clamping member 46 is adapted to clamp the twisted portion 6 at the leading position by the apex portion 84 of the projecting portion 81 in cooperation with the bottom portion 85 of the recessed surface 40 and clamp the twisted portion 6 at the following position by the apex portion 84 of the projecting portion 82 in cooperation with the bottom portion 85 of the recessed surface 41.

Thus the clamping member 46 has the at least two projecting portions 81 and 82 spaced apart in the conveying direction A to clamp the twisted portion 6 at the two positions 6A and 6B spaced apart in the conveying direction A in cooperation with the pincher member 27 of the stuffed-casing constriction-forming and conveying means 7.

The surface pushing means 78 for pushing the clamping member 46 toward the twisted portion 6 of the stuffed casing 4 to cause the clamping member 46 to effect the clamping of the twisted portion 6 at the two positions 6A and 6B spaced apart in the conveying direction A has a pushing plate 90, serving as slidably guiding plate, which is attached to the base 55 by a bolt 88 and whose one edge is relatively slidably brought into contact with the chain 30. The pushing plate 90 is adapted to guide the chain 30 to cause the traveling position of the chain 30 to come closer toward the chain 29 as its one edge 89 comes into contact with the chain 30 traveling in the direction A, thereby pushing the clamping member 46 toward the twisted portion 6 of the stuffed casing 4 in the direction B. An elongated through hole 90A in the pushing plate 90, in which the bolt 88 is inserted, makes the fixing position of the pushing plate 90 in the direction B adjustable, thereby making adjustable the condition of surfaces fitting between the projecting surfaces 81A, 82A and the recessed surfaces 40, 41.

The clamping-force securing means 80 has a clamping-force generating plate 93 which is attached to the base 55 by a bolt 91 and whose one edge 92 disposed substantially on an extension of the one edge 66 is adapted to relatively slidably come into contact with the chain 29. When the clamping member 46 is pushed out in the direction B by the pushing plate 90 to clamp the twisted portion 6 at the two positions 6A and 6B, the clamping-force generating plate 93 is adapted to prevent the movement of the pincher member 27 similarly in the direction B by receiving this pushing force and generate the clamping force in cooperation with the clamping member 46, thereby ensuring the clamping of the twisted portion 6 at the two positions 6A and 6B by the clamping member 46.

The aligning means 79 includes an aligning member 96 attached by a bolt 95 to a leading adjacent link 30B of a chain link 30A to which the clamping member 46 is attached, as well as an aligning member 97 attached to a following adjacent link 30C of the link 30A by the bolt 95. The aligning member 96 and the aligning member 97 respectively have U-shaped configurations (see FIG. 3), and align the mutual positions of the clamping member 46 and the pincher member 27 in the conveying direction A by clamping in cooperation the pincher member 27 opposing the clamping member 46 by upper and lower portions of their respective clamping surfaces 96A and 97A (see FIGS. 5 and 6).

In the clamping means 75, in order that the twisted portion 6 which has reached the cutting operation area SC2 after passing through the constriction-forming and conveying area SC1 can be clamped prior to starting the cutting operation, the interval between the opposing surfaces, i.e., the length of the interval O between the projecting surfaces 81A, 82A and the recessed surfaces 40, 41, is reduced so that the respective projecting surfaces 81A, 82A and the recessed surfaces 40, 41 substantially abut against each other.

The cutting means 76 has a cutting blade 100 disposed in the gap 37 of each pincher member 27, as well as a moving means 101 for moving the cutting blade 100 toward the twisted portion 6 located between the two positions 6A and 6B and clamped by the corresponding clamping member 46 at the time of cutting the twisted portion 6.

The cutting blade 100 is formed integrally at one end of an arm member 103 of the moving means 101. This cutting blade 100 may be structured so as to be detachably attached to the arm member 103. The moving means 101 includes the arm member 103 which is supported by the pincher member 27 via a shaft 102 in such a manner as to be swingable in a direction C, as well as a guiding means 104 for guiding the other end of the arm member 103 in such a way as to swing the arm member 103 in the direction C.

The guiding means 104 includes a cam roller 111 rotatably attached to a cam roller pin 115 secured to the other end of the arm member 103; a guide rail 112 supported by the base 55 and disposed above the traveling path of the chain 29 substantially along the traveling passage; and a guide rail 113 supported by the base 55 and disposed above the cutting operation area SC2 where the clamping member 46 is pushed in the direction B by the pushing plate 90. The guide rail 113 in the conveying direction A extends in such a manner as to gradually jut out toward the guide rail 112 side and then return to its original position, while the guide rail 112 extends in such a manner as to be parallel to the guide rail 113 at a position where the guide rails 112 faces the guide rail 113.

Instead of the guide rails 112 and 113, the guiding means 104 may be provided with a known actuator such as a high-speed operating air cylinder or the like for pressing the cam roller 111.

Figure 7:
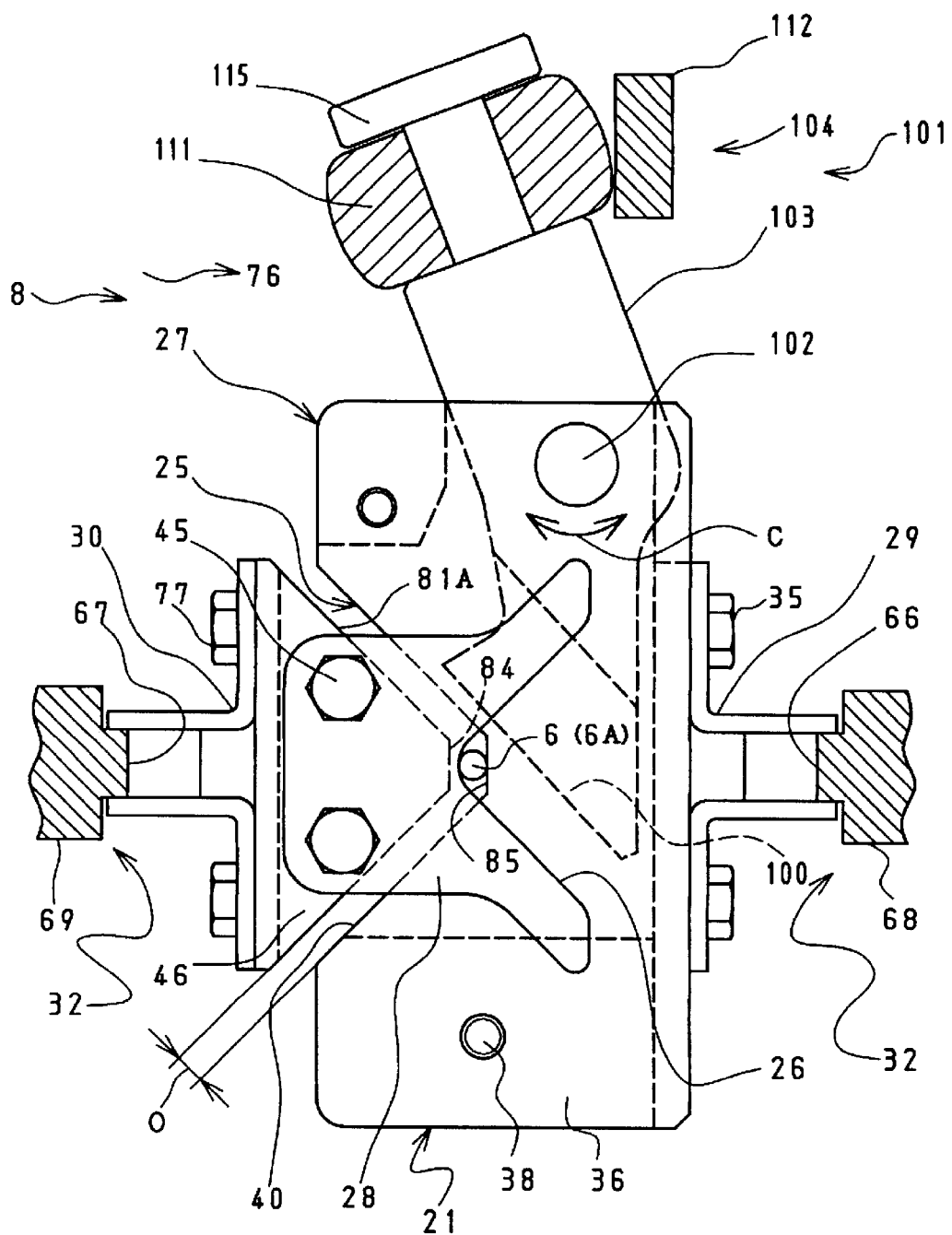
FIG. 7 is an explanatory diagram principally illustrating the relationship among a separating means, the pincher members, and the clamping member of the embodiment shown in FIG. 1.
Figure 8:
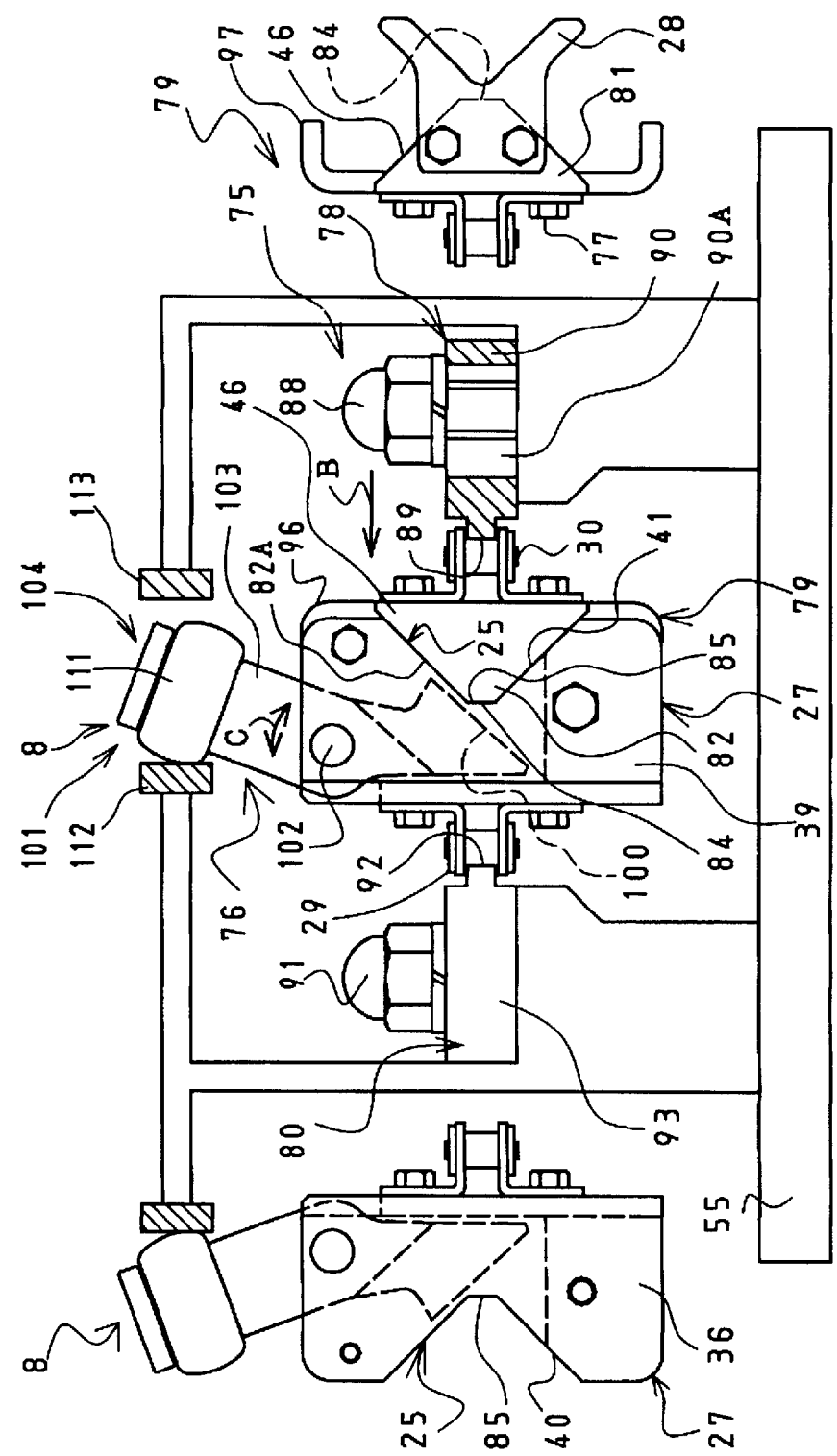
FIG. 8 is a front view principally illustrating the separating means of the embodiment shown in FIG. 1.
Figure 9:
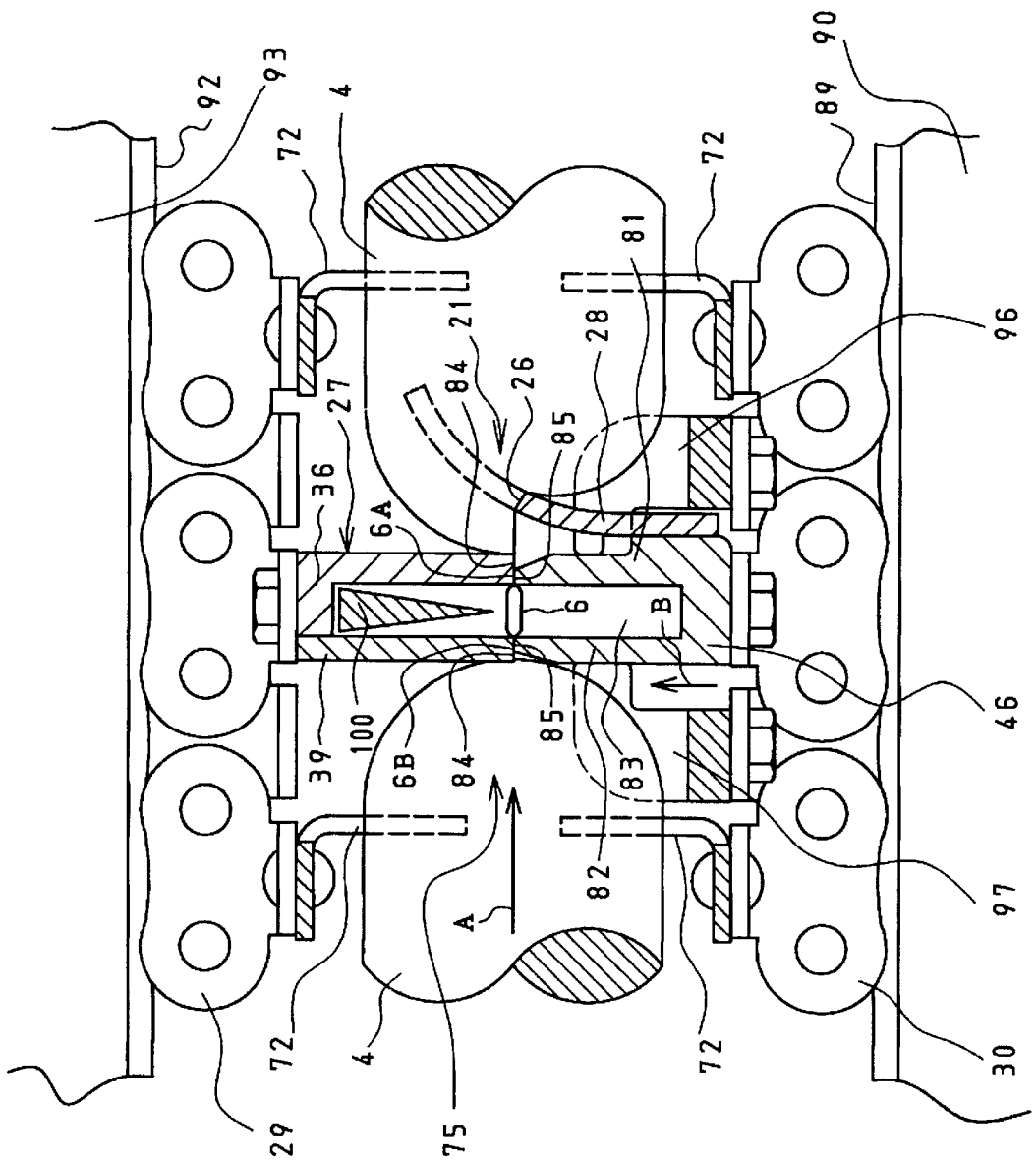
FIG. 9 is a diagram principally explaining the operation of the pincher members and the clamping member of the embodiment shown in FIG. 1.
Figure 10:
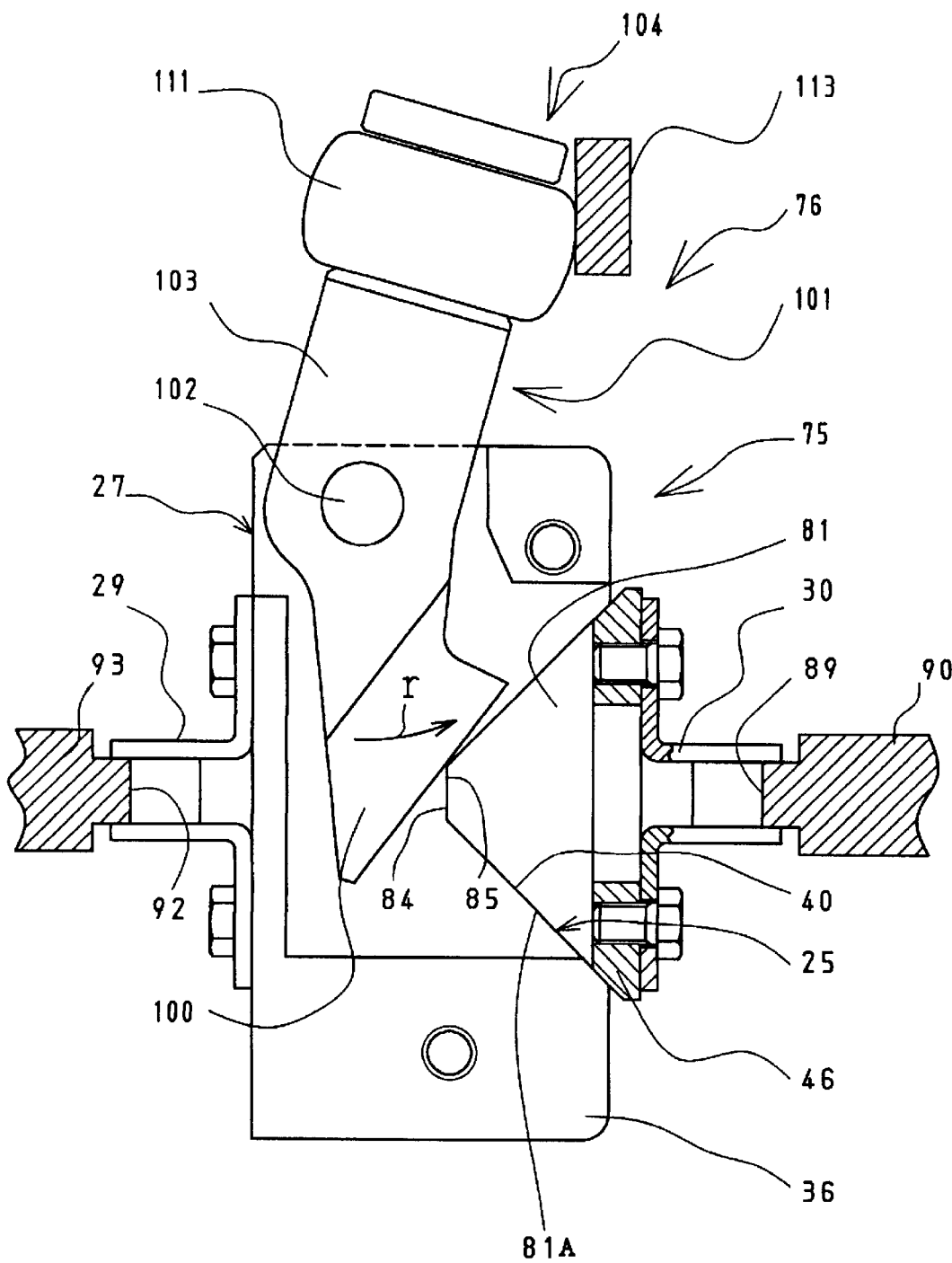
FIG. 10 is a diagram principally explaining the operation of the separating means of the embodiment shown in FIG. 1.
Figure 11:
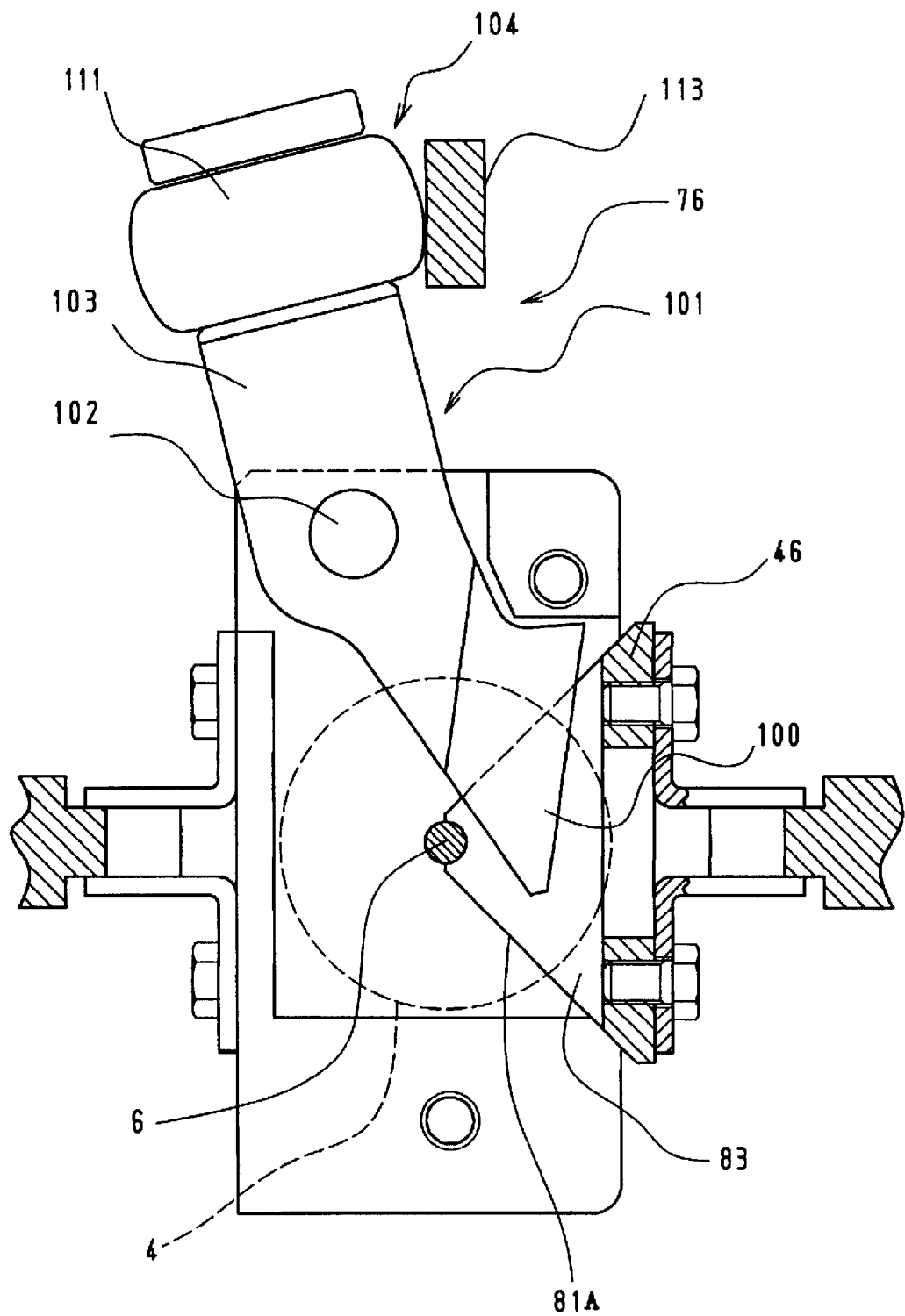
FIG. 11 is a diagram principally explaining the operation of the separating means of the embodiment shown in FIG. 1.

As particularly shown in FIGS. 7 and 8, during the movement of the pincher member 27 in the direction A due to the traveling of the chain 29 in the direction A, the moving means 101 initially allows the cam roller 111 to come into contact with the guide rail 112, holds the arm member 103 at one rotated position, and disposes the cutting blade 100 to a noncutting position. Subsequently, upon completion of the pushing of the clamping member 46 in the direction B by the pushing plate 90 (see FIGS. 8 and 9), as particularly shown in FIG. 10, the contact of the cam roller 111 against the guide rail 112 is canceled, while the cam roller 111 is begun to be brought into contact with the guide rail 113, the arm member 103 is swung from the one rotated position, and the cutting blade 100 is moved toward the twisted portion 6 in such a manner as to depict an arcuate locus r. Further, as particularly shown in FIG. 11, the arm member 103 is swung to a maximally rotated position by the continuous contact of the cam roller 111 against the guide rail 113 to move the cutting blade 100 to a cutting completion position within the space 83 while depicting an arcuate locus. Subsequently, the contact of the cam roller 111 against the guide rail 113 is canceled, the contact of the cam roller 111 against the guide rail 112 is resumed to return the arm member 103 to the one rotated position, thereby disposing the cutting blade 100 to its noncutting position.

After the twisted portion 6 has been clamped at the two positions 6A and 6B by the clamping member 46, the cutting means 76 is adapted to cut the twisted portion 6 between the two positions 6A and 6B by the cutting blade 100 while depicting an arcuate locus midway in the swinging motion of the arm member 103 to its maximally rotated position. As a result of the fact that the twisted portion 6 is cut by the cutting blade 100 of the cutting means 76, sausages 121 are consecutively manufactured as foodstuffs which are separated from each other at the twisted portions 6.

After alignment of the pincher member 27 and the clamping member 46 by the aligning means 79, the clamping means 75 forcibly causes the pincher member 27 and the clamping member 46 to fit to each other at their recessed and projecting surfaces, so that the pincher member 27 and the clamping member 46 in the cutting operation area SC2 assume a substantially integrated structure. Consequently, it is possible to ensure the clamping of the twisted portion 6 by the pincher member 27 and the clamping member 46.

Even if a reaction force from the guide rail 113 is applied to the pincher member 27 during the cutting of the twisted portion 6, the alignment of the pincher member 27 with respect to the clamping member 46 can be maintained due to the aforementioned substantially integrated structure. Accordingly, it is possible to ensure that the arm member 103 and the cutting blade 100 which are provided on the pincher member 27 move into the space 83 provided in the opposing clamping member 46 during the cutting of the twisted portion 6. Consequently, it is possible to eliminate the risk of collision against the projecting portions 81 and 82 of the clamping member 46 by the cutting blade 100 undergoing the cutting operation.

Figure 2:
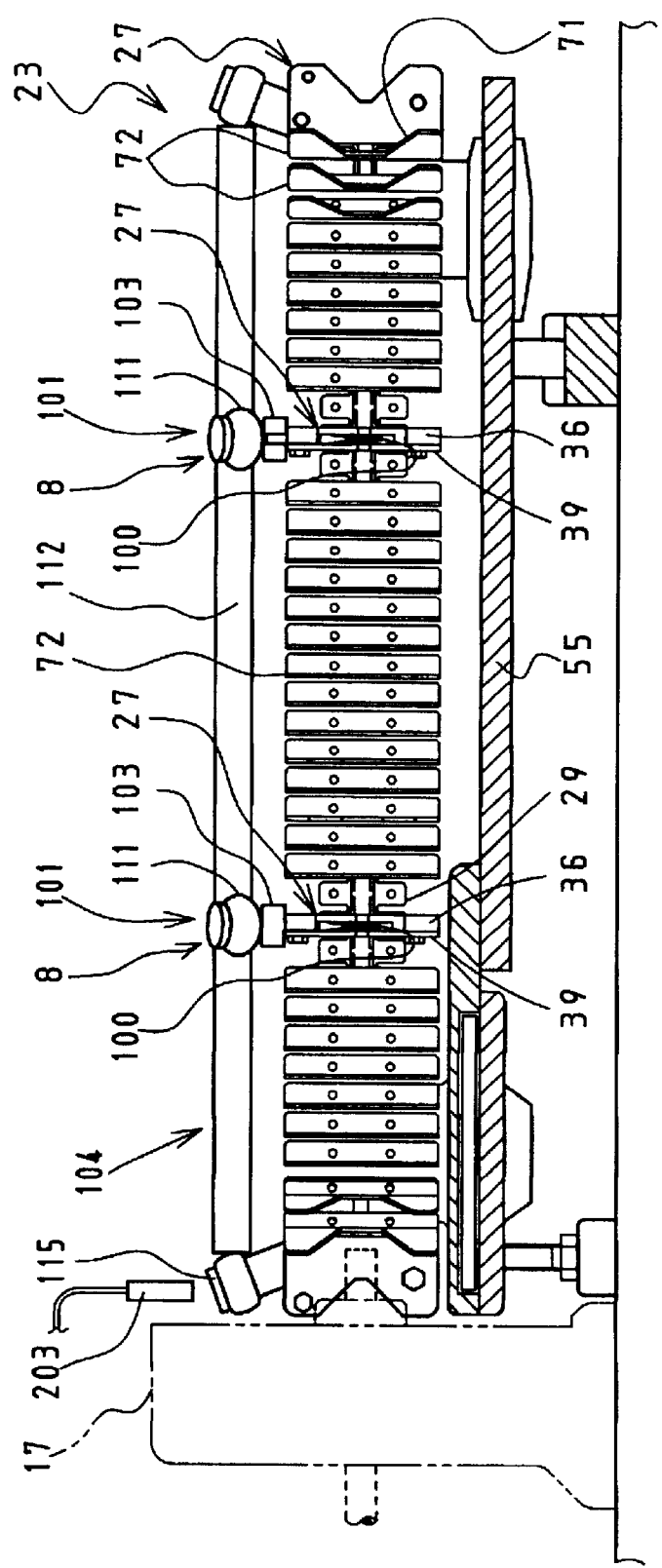
FIG. 2 is an explanatory side elevational view principally illustrating one chain side of the embodiment shown in FIG. 1.
Figure 3:
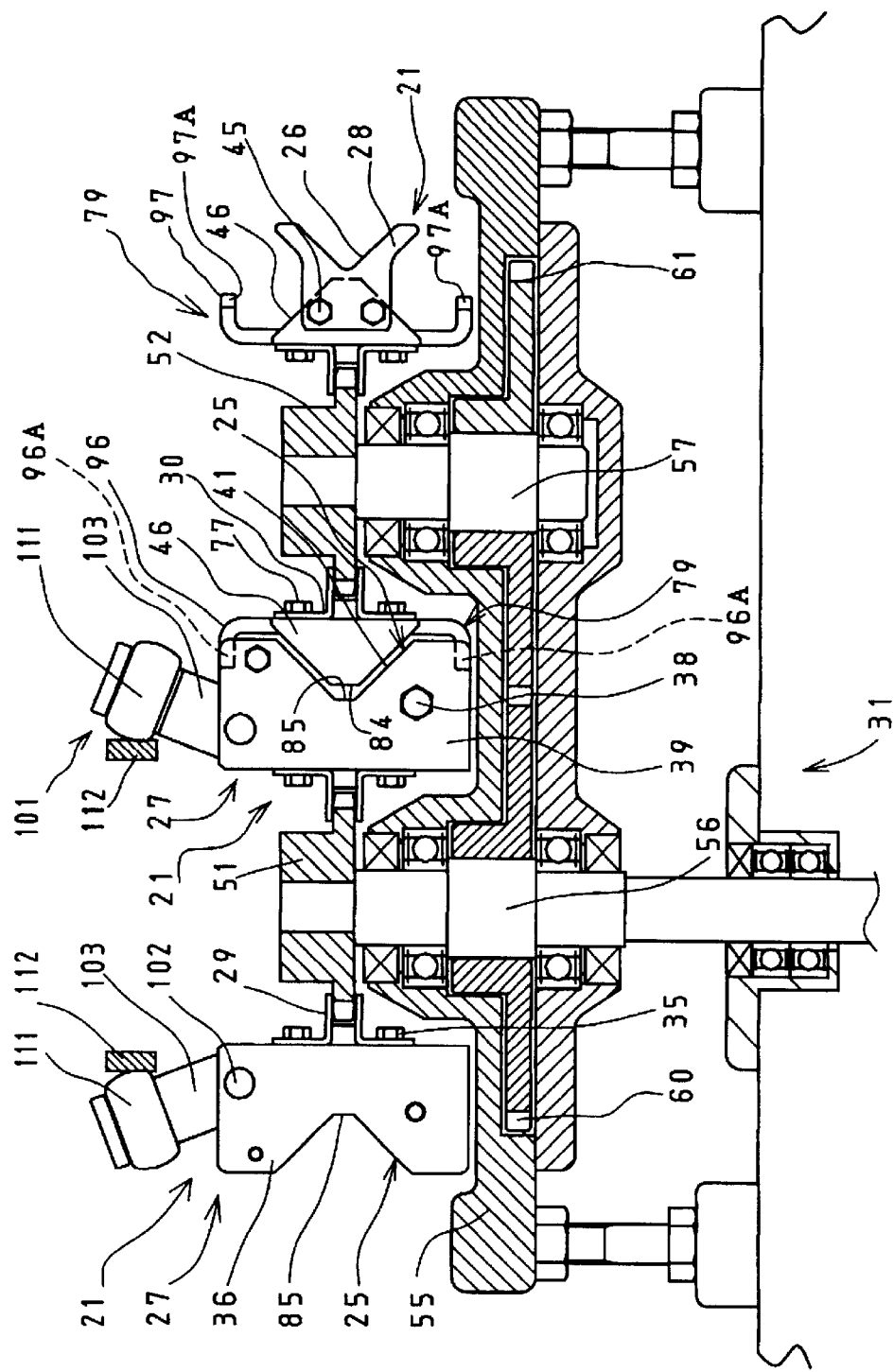
FIG. 3 is an explanatory front cross-sectional view of the embodiment shown in FIG. 1.
Figure 4:
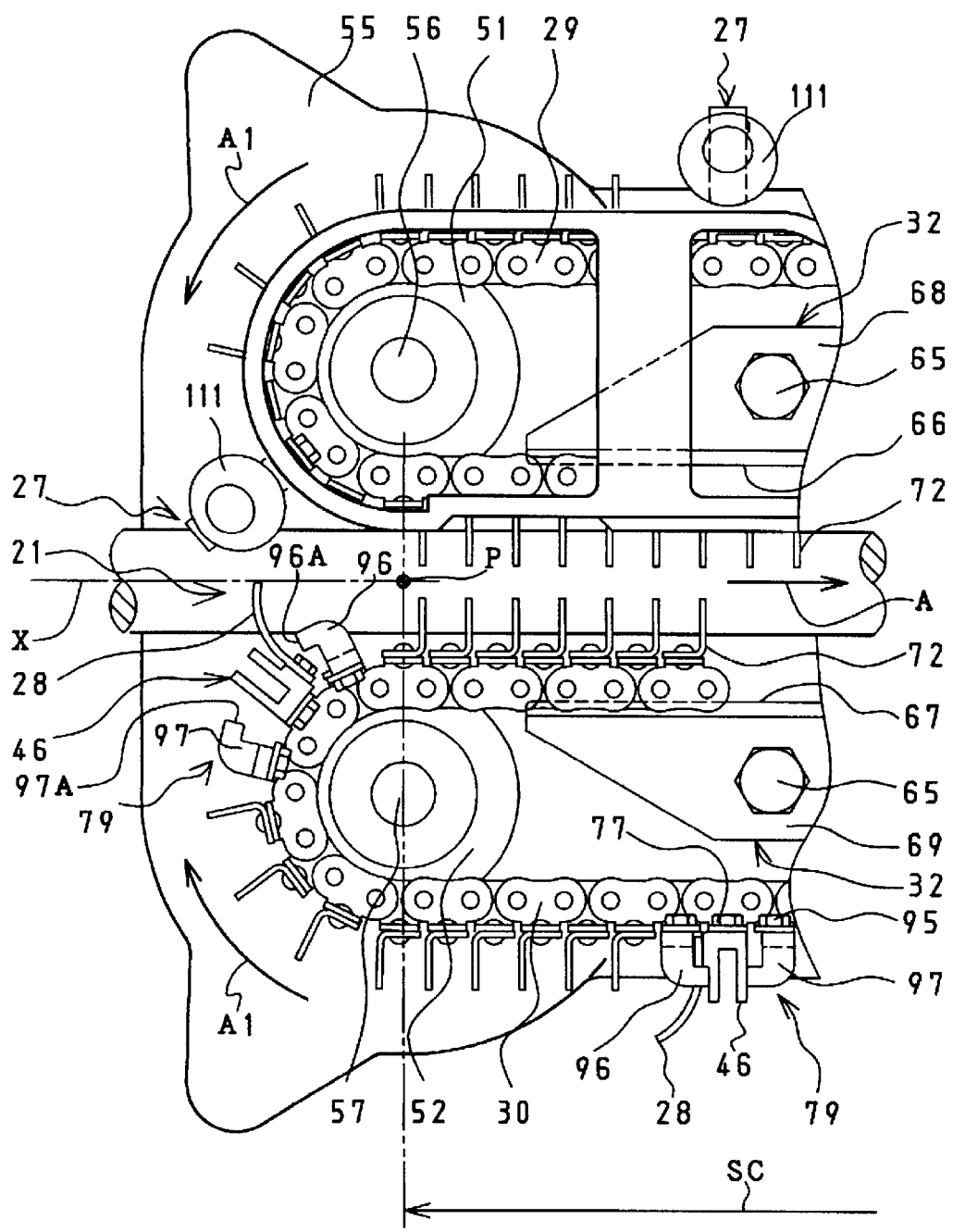
FIG. 4 is an explanatory partial plan view of the embodiment shown in FIG. 1.

As shown in FIG. 2, the holding means 23 has a multiplicity of trapezoidal lugs 72 respectively having recessed surfaces 71 and attached to each of the chains 29 and 30. By holding the stuffed casing 4 at its recessed surfaces 71, the holding means 23 assists the clamping of the twisted portions 6 by the clamping members 46 and the pincher members 27. In the manufacture of sausages having twisted portions 6 which are particularly likely to escape during cutting, the holding means 23 in cooperation with the clamping members 46 and the pincher members 28 prevents the escape of the twisted portions 6 during cutting.

In the present invention, it is possible to form twisted portions by squeezing and constricting the rotating stuffed casing through cooperation between the pincher members and clamping members so as to manufacture foodstuffs such as sausages by cutting the twisted portions by the cutting means, as will be described below.

Figure 12:
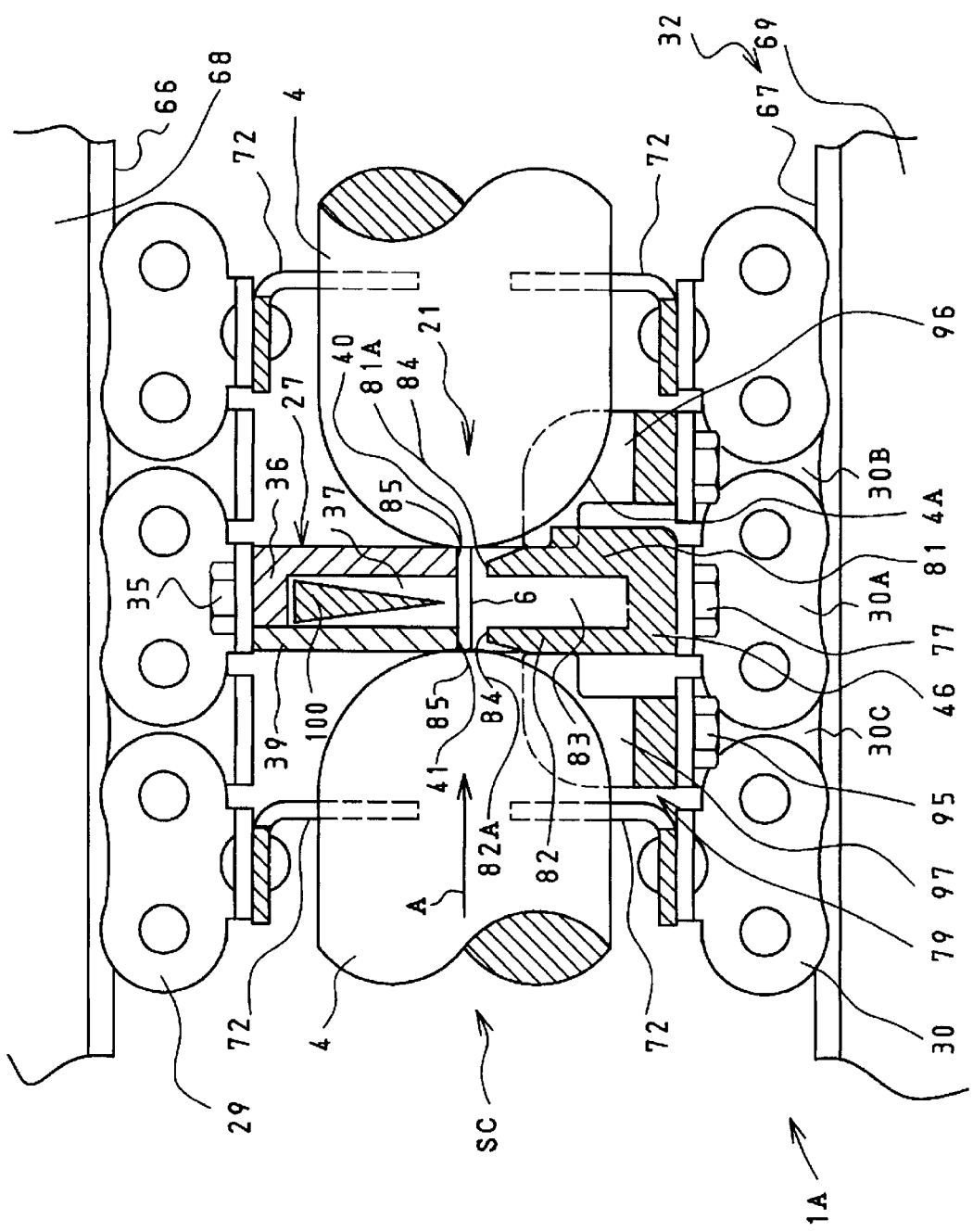
FIG. 12 is an explanatory plan cross-sectional view principally illustrating the pincher members and the clamping member in accordance with another preferred embodiment of the invention.
Figure 13:
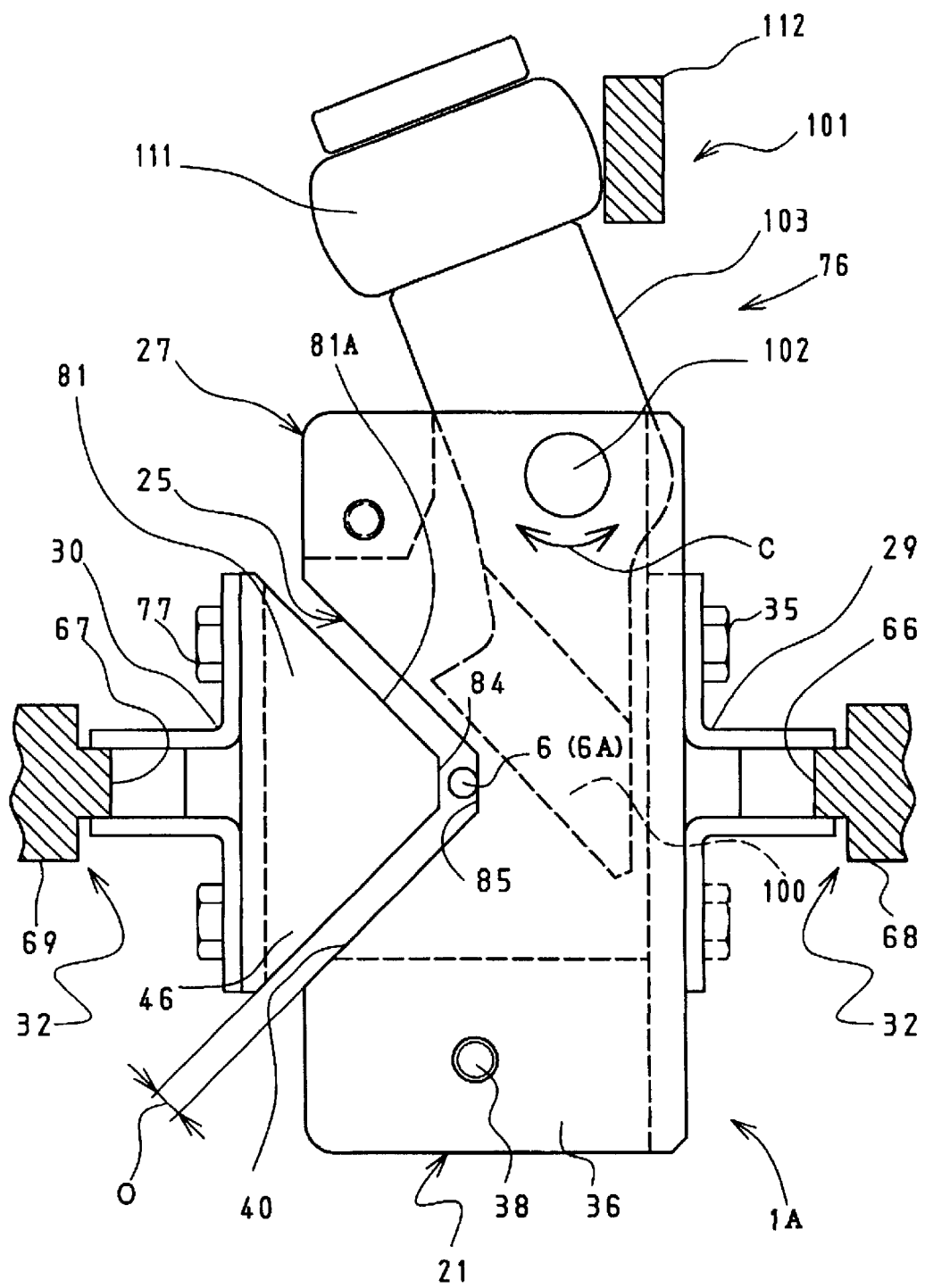
FIG. 13 is an explanatory diagram principally illustrating the relationship among the separating means and the pincher members of the embodiment shown in FIG. 12.

The structure of an apparatus 1A for manufacturing foodstuffs such as sausages in an embodiment shown in FIGS. 12 and 13 differs from the structure of the apparatus shown in FIGS. 1 to 11 only in that the pincher members 28 are not provided. Referring to FIGS. 1 to 11 as well, this apparatus 1A is comprised of the stuffed-casing forming and rotating means 5 for forming the stuffed casing 4 and rotating the stuffed casing 4; the pair of chains 29 and 30 serving as the pair of endless members for forming the conveying area SC for conveying the stuffed casing 4; the pincher members 27 attached to the chain 29, i.e., one of the endless members, at the predetermined intervals D and respectively having the recessed surfaces 25; the clamping members 46 attached to the chain 30, i.e., the other one of the endless members, at the predetermined intervals D and adapted to move in a state of being fitted to the recessed surfaces 25 so as to produce the interval O between the opposing surfaces with respect to the recessed surfaces 25 of the pincher members 27 in the conveying area SC, the clamping members 46 having the projecting portions 81 and 81 with the projecting surfaces 81A and 82A formed thereon; the stuffed-casing rotating means 14 for rotating the stuffed casing 4 to form the twisted portion 6 in the stuffed casing 4 located between the projecting surfaces 81A, 82A and the recessed surfaces 40, 41 of the recessed surface 25 which are fitted to each other; the cutting means 76 each having the cutting blade 100 and the moving means 101 attached swingably to the pincher member 27 so move the cutting blade 100 toward the clamping member 46; and the surface pushing means 78 for relatively pushing out the projecting portions 81 and 82 of the clamping member 46 toward the recessed surface 25 of each pincher member 27 so as to reduce the interval between the opposing recessed surface 25 and projecting surfaces 81A, 81B fitted in the recessed surface 25.

The apparatus 1A in this embodiment is not provided with the pincher members 28 used in the above-described apparatus 1, and the stuffed casing 4 is squeezed and constricted through cooperation between the pincher member 27 and the clamping member 46. Namely, in this apparatus 1A, the pincher member 27 and the clamping member 46 which move in the direction of A1 toward a meshing position P from outside the conveying area SC are engaged with the stuffed casing 4 at the recessed surface 25 and the projecting surfaces 81A, 82A midway in their movement, and begin to squeeze and constrict the rotating stuffed casing 4. As a result, the formation of the twisted portion 6 is started simultaneously with the engagement. When the pincher member 27 and the clamping member 46 arrive at the meshing position P, the constriction of the stuffed casing 4 ends. After the arrival of the pincher member 27 and the clamping member 46 at the meshing position P, the operation of the apparatus 1A is substantially similar to that of the apparatus 1.

The apparatus 1A in this embodiment in which the stuffed casing 4 is squeezed and constricted by cooperation between the pincher member 27 and the clamping member 46 allows the shape of an end portion 4A of the stuffed casing 4 formed by the constriction to be made into a more spherical shape.

The surface pushing means 78 has an other-endless-member slidably guiding plate 90 for slidably guiding the chain 30, i.e., the other endless member with the clamping member 46 attached thereto, toward the chain 29, i.e., one endless member with the pincher member 27 attached thereto. Alternatively, the surface pushing means 78 may have a one-endless-member slidably guiding plate for slidably guiding the chain 29, i.e., one endless member with the pincher member 27 attached thereto, toward the chain 30, i.e., the other endless member with the clamping member 46 attached thereto. It suffices if the one-endless-member slidably guiding plate is structured in the same way as the other-endless-member slidably guiding plate 90.

As described above, in the manufacturing apparatuses 1 and 1A in accordance with the embodiments, since the arrangement provided is such that the clamping means 75 clamps the twisted portion 6 at the two positions 6A and 6B spaced apart in the conveying direction A, and the cutting means 76 cuts the twisted portion 6 located between the two positions 6A and 6B of the twisted portion 6 and clamped, it is possible to suppress the elongation and the escape of the twisted portion 6 as much as possible. Accordingly, even in the case of a natural intestine casing, the twisted portion 6 can be cut reliably without an error by the cutting means 76. Moreover, since the twisted portion 6 is clamped at the two positions 6A and 6B through the fitting condition of the recessed surfaces 40, 41 and the projecting surfaces 81A, 82A, the twisted portion 6 can be clamped securely, and the drawbacks such as the elongation and escape of the twisted portion 6 can be avoided. Furthermore, since the arrangement provided is such that since the cutting blade 100 is moved toward the twisted portion 6 while depicting the arcuate locus r to cut the twisted portion 6 midway in this movement, the twisted portion 6 can be reliably cut without an error.

The above-described apparatuses 1 and 1A may be provided with a speed means whereby the stuffed-casing rotating means 14 changes the rotational speed of the stuffing tube 12 to rotate the stuffing tube 12. Hereafter, referring to FIGS. 14 to 16, a description will be given of the arrangement of the stuffed-casing rotating means 14 having the speed means, together with the arrangement of the stuffed-casing constriction-forming and conveying means 7 which operates in association with the speed means.

The moving means 31 of the stuffed-casing constriction-forming and conveying means 7 includes a motor 114 having a shaft 114A connected to a rotating shaft 56 with the sprocket 51 secured thereto, so as to drive the rotating shaft 56.

The stuffed-casing rotating means 14 includes a stuffing-tube rotating mechanism 141 connected to the stuffing tube 12 to rotate the stuffing tube 12 in the direction R; a braking-member rotating mechanism 142 for rotating the braking member secured to the pulley 18 in the direction R; and a speed means 201 for rotating the stuffing tube 12 by changing the rotational speed of the stuffing tube 12.

The stuffing-tube rotating mechanism 141 includes a stuffing-tube rotating motor 143, a pulley 144, a belt 145, a stuffing-tube rotating pulley 146, and a housing 147 for rotatably supporting the stuffing-tube rotating pulley 146. The stuffing-tube rotating pulley 146 is engaged with the stuffing tube 12 and rotatively drives the stuffing tube 12.

The braking-member rotating mechanism 142 includes a braking-member rotating motor 148, a pulley 149, a belt 150, the pulley 18, the bearing 16, and the housing 17.

The speed means 201 is a means for rotating the stuffing tube 12 by changing the rotational speed of the stuffing tube 12 with at least two speeds including a minimum speed VL, which is not zero, and a maximum speed VH. The speed means 201 includes a detector 203 constituted by a proximity sensor for detecting the arrival of the pincher member 27 at a predetermined position and outputting a signal 202 indicating the arrival at the predetermined position; a signal generating means 205 for detecting the movement of the pincher member 27 and outputting a signal 204 for each unit amount of movement of the pincher member 27; a controlling means 206 for controlling the generation of the minimum speed VL and the maximum speed VH; and a servo amplifier 207 for rotating the stuffing-tube rotating motor 143 in response to a control signal from the controlling means 206.

The stuffed-casing constriction-forming and conveying means 7 and the stuffed-casing rotating means 14 shown in FIGS. 14 to 16 operate as follows. When the detector 203 detects the arrival of the pincher member 27 by detecting a head portion of a cam roller pin 115 provided on the pincher member 27 when the sprocket 51 is rotated by the rotative driving of the motor 114, a counter 321 which receives a pulse 1 of the signal 204 from the detector 203 starts counting pulses of a signal 317, which correspond to rises and falls of signals 313 and 314, starting with the pulse 1. When the count of the counter 321 has reached a predetermined discrete value (in this embodiment, a fifth pulse), a maximum-speed command signal is generated. Upon generation of the maximum-speed command signal, the stuffing-tube rotating motor 143 increases its rotational speed so as to rotate the stuffing tube 12 at the maximum speed VH.

While the sprocket 51 further rotates during the rotation of the stuffing tube 12 at the maximum speed VH, when count of the counter 321 reaches a predetermined discrete value, the generation of the maximum-speed command signal is stopped, and a minimum-speed command signal is generated instead. Upon generation of the minimum-speed command signal, the stuffing-tube rotating motor 143 decreases its rotational speed so as to rotate the stuffing tube 12 at the minimum speed VL.

Here, the minimum speed VL of rotation of the stuffing tube 12 refers to a speed at which it is possible to prevent the occurrence of a twist attributable to a speed difference with the maximum speed VH at a portion of the stuffed casing which is not being squeezed by the pincher members 27 and 28 or the clamping member 46.

Just before and upon arrival of the pincher member 27 at the meshing position P, the maximum speed VH is generated for the stuffing tube 12, and during the period of this maximum speed VH a greater number of revolutions is imparted to the stuffed casing, so as to produce a major portion of the number of twists required for the portion of the stuffed casing being squeezed by the pincher member 27 and the clamping member 46. When the pincher member 27 begins to engage the stuffed casing, the engaged portion of the stuffed casing is rotated at the maximum speed VH, and since a greater number of twists is imparted until the squeezing is completed at the meshing position P, a twisted portion can occur reliably at the squeezed portion. At the same time, since the twisting is completed in s shorter time relative to the conveying time per link length, the material located at the portion where the twist occurs can be removed from that portion. In addition, it is possible to prevent a twist from occurring at a portion of the stuffed natural intestine casing which is not being squeezed.

Figure 14:
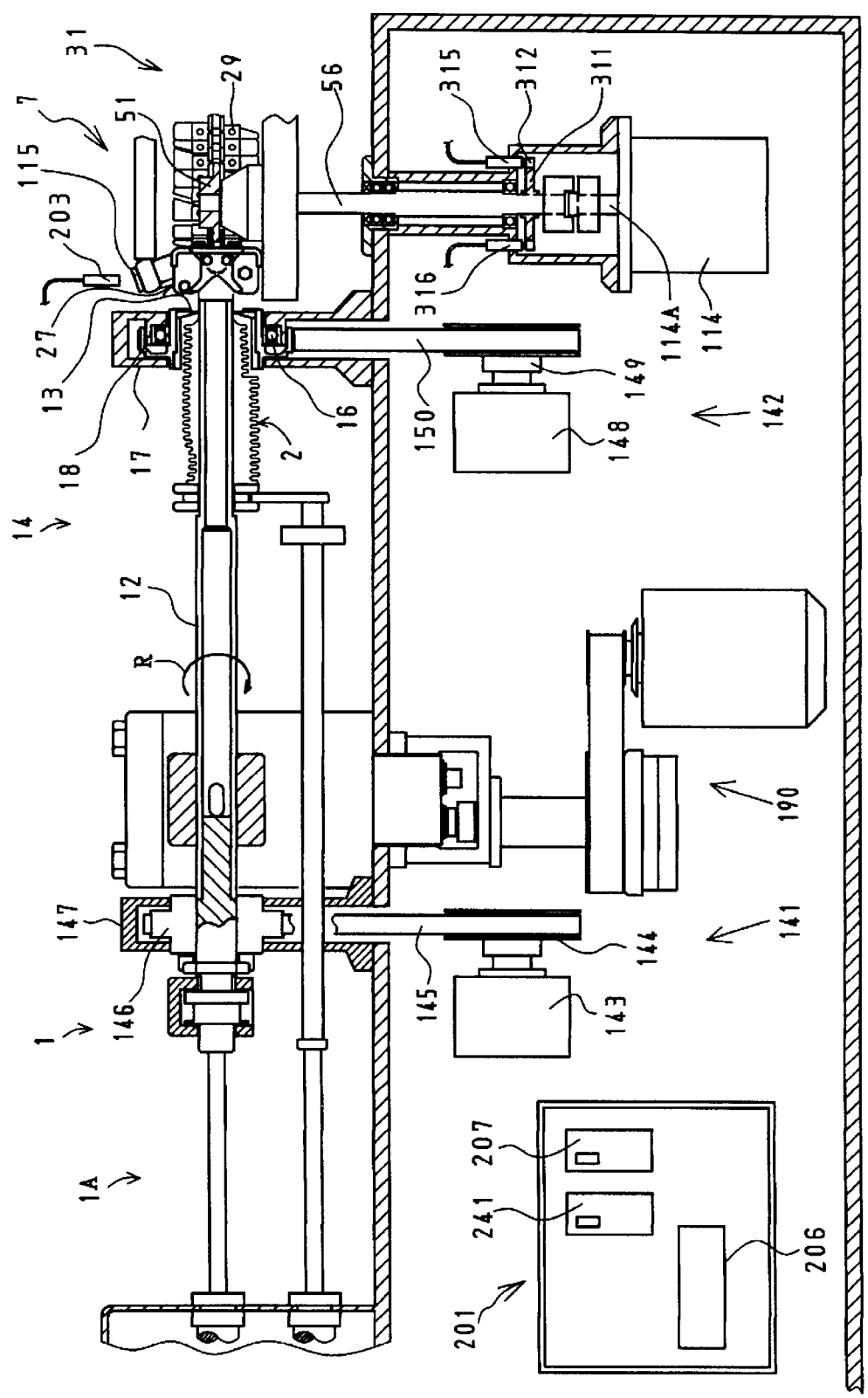
FIG. 14 is an explanatory front view principally illustrating a stuffed-casing rotating means and a speed means in accordance with still another preferred embodiment of the invention.
Figure 15:
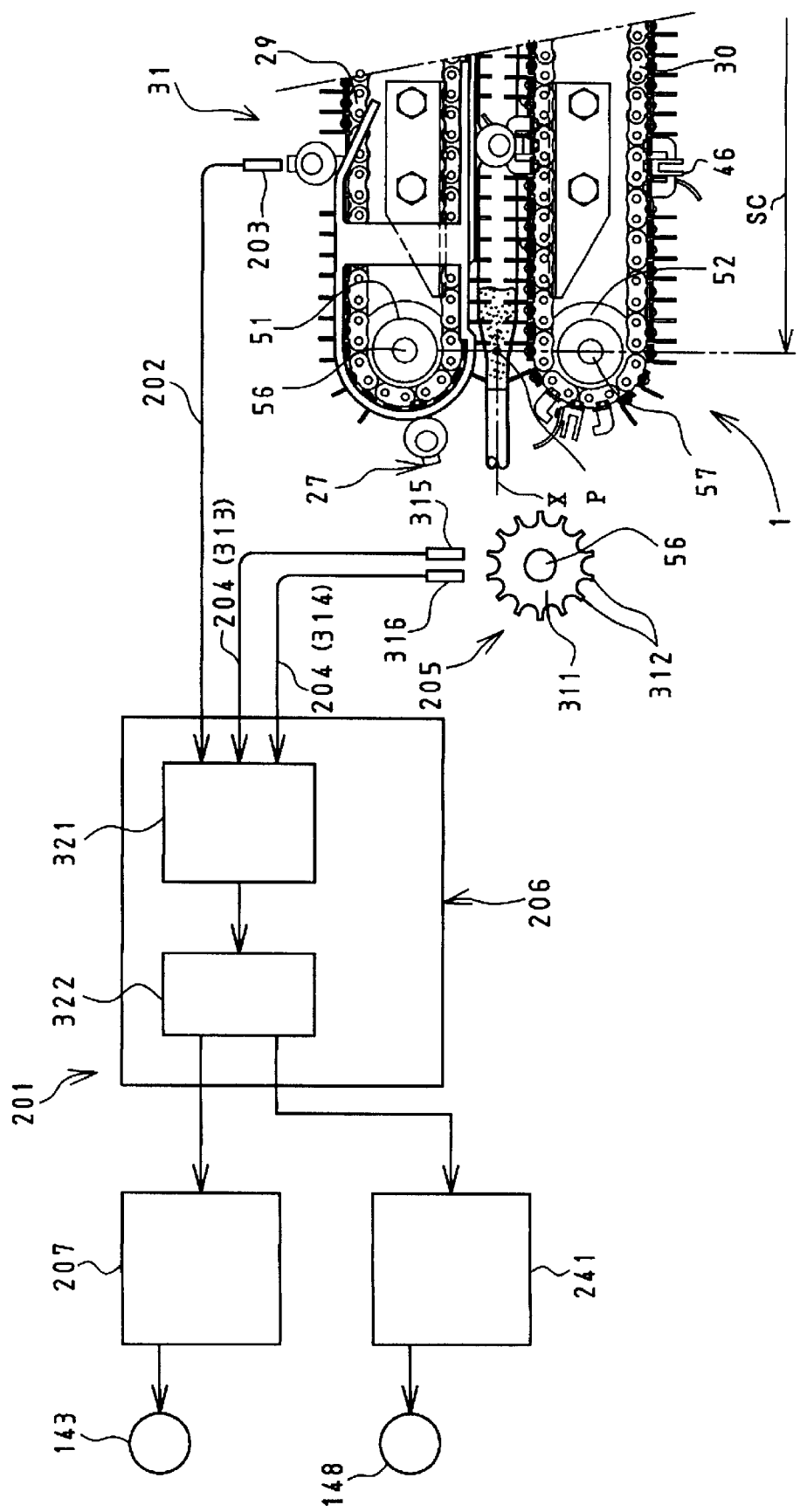
FIG. 15 is a block diagram principally explaining the operation of the speed means of the embodiment shown in FIG. 14.
Figure 16:
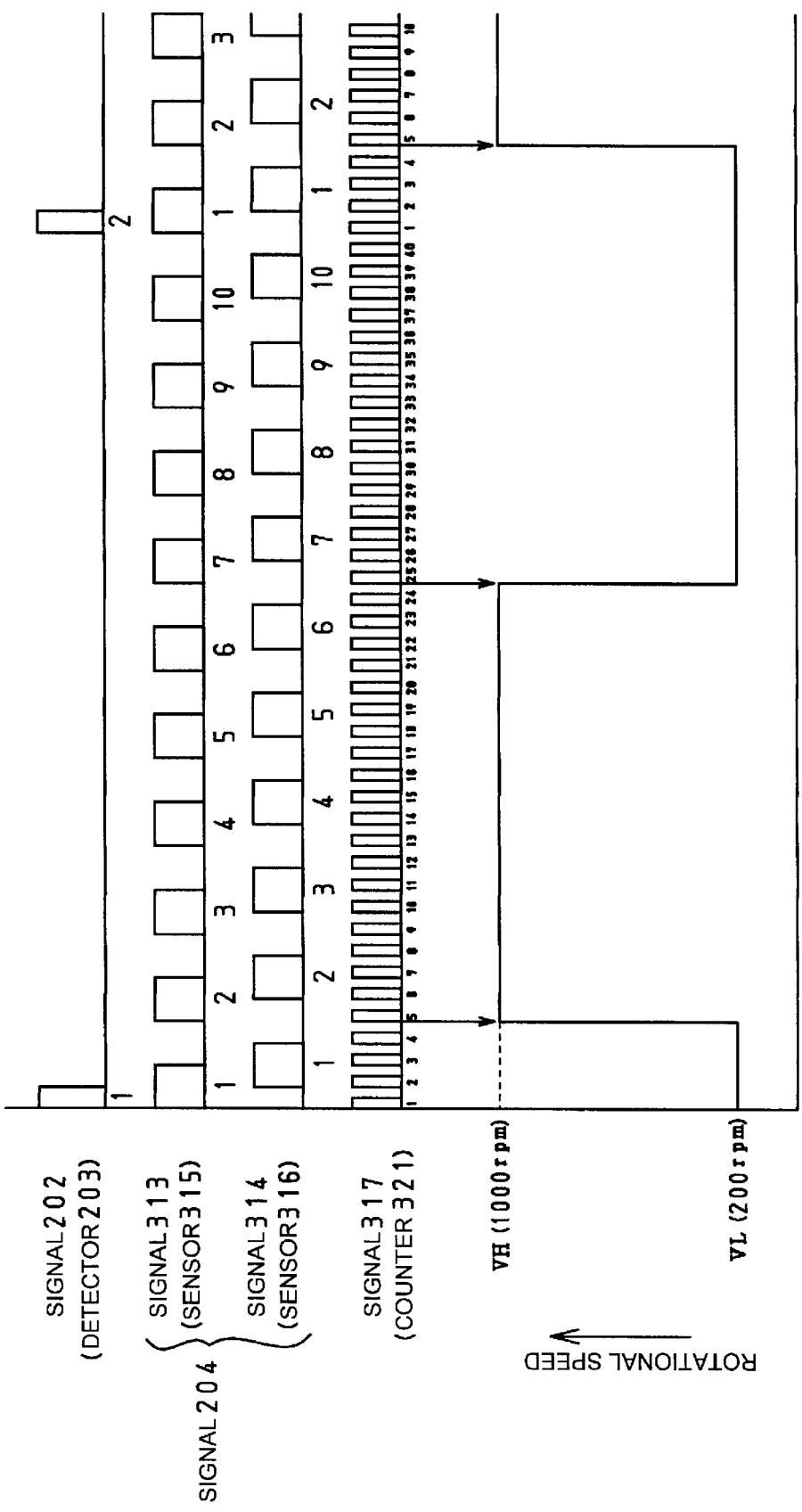
FIG. 16 is a timing chart of the example shown in FIG. 15.
Figure 17:
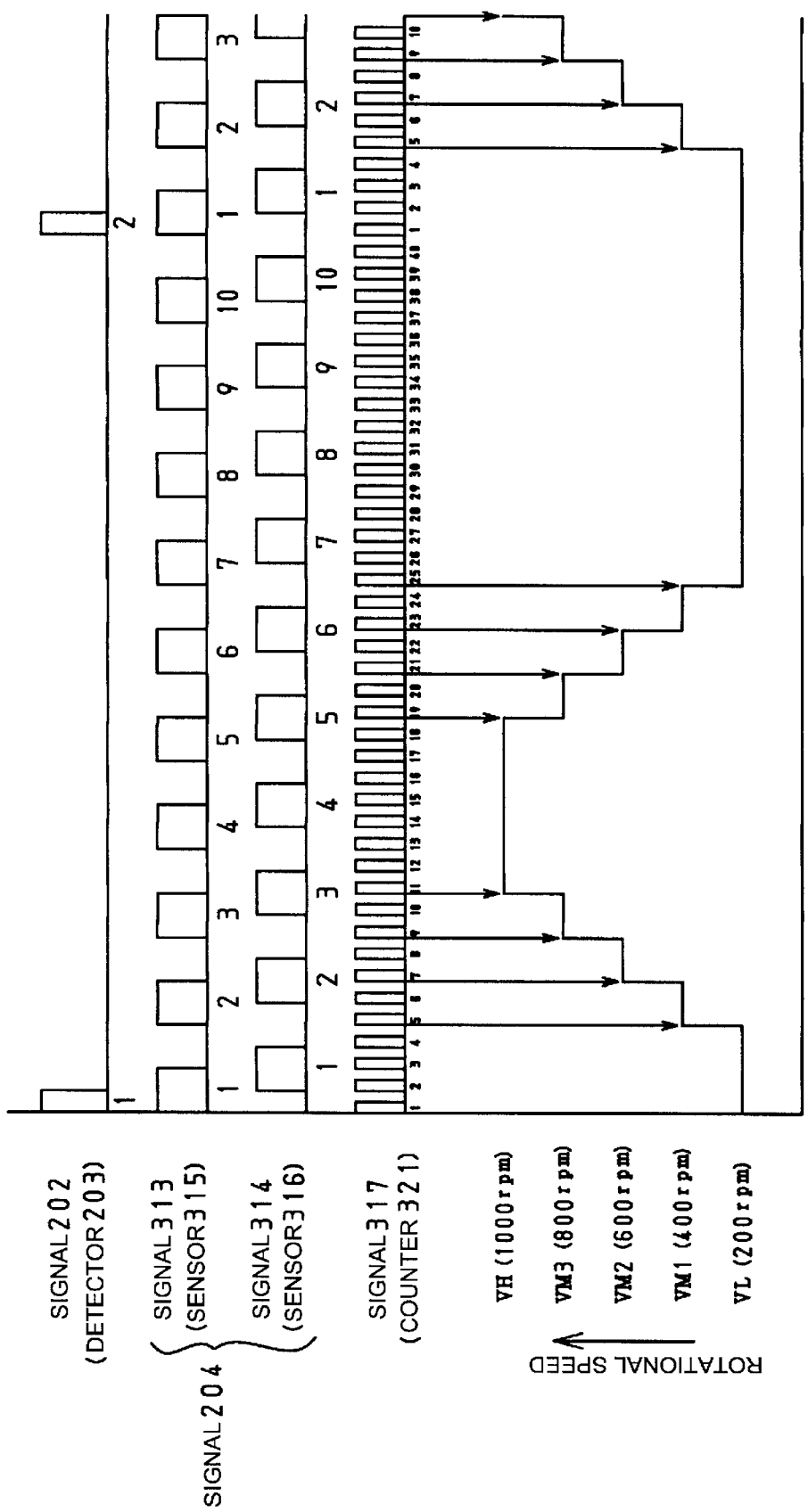
FIG. 17 is another timing chart of the example shown in FIG. 15.

In the embodiment shown in FIGS. 14 to 16, the arrangement provided is such that the stuffing tube 12 is immediately rotated at two speeds of the maximum speed VH and the minimum speed VL, an arrangement may be alternatively provided as shown in FIG. 17, in which the stuffing tube 12 is made to increase its speed gradually and is finally rotated at the maximum speed VH, while the stuffing tube 12 is made to decrease its speed gradually and is finally rotated at the minimum speed VL.

In the example shown in FIGS. 14 to 17, the minimum speed VL of the stuffing tube 12 is set to a speed which is not zero. In the present invention, however, it is possible to provide a speed means for rotating the stuffing tube by changing the rotational speed of the stuffing tube with at least two speeds of a zero speed and a maximum speed. This makes it possible to impart a required number of twists to the stuffed casing in a shorter time. In this case, it is preferable to use a natural intestine casing of a shape whose curve is not large, so as to prevent the occurrence of a twist at a portion which is not a twisted portion.

The stuffed casing 4 is constricted to generate the twisted portions 6 in the stuffed casing 4 by means of the pincher members 27 and 28 respectively having the recessed surfaces in the case of the apparatus 1, and by means of teh pincher members 27 having the recessed surfaces and the clamping members 46 having the projecting surfaces in the case of the apparatus 1A, respectively. In the present invention, however, the shape of the members for squeezing and constricting the stuffed casing 4 is not limited. Next, a description will be given of an apparatus 500 in accordance with still another embodiment.

Figure 18:
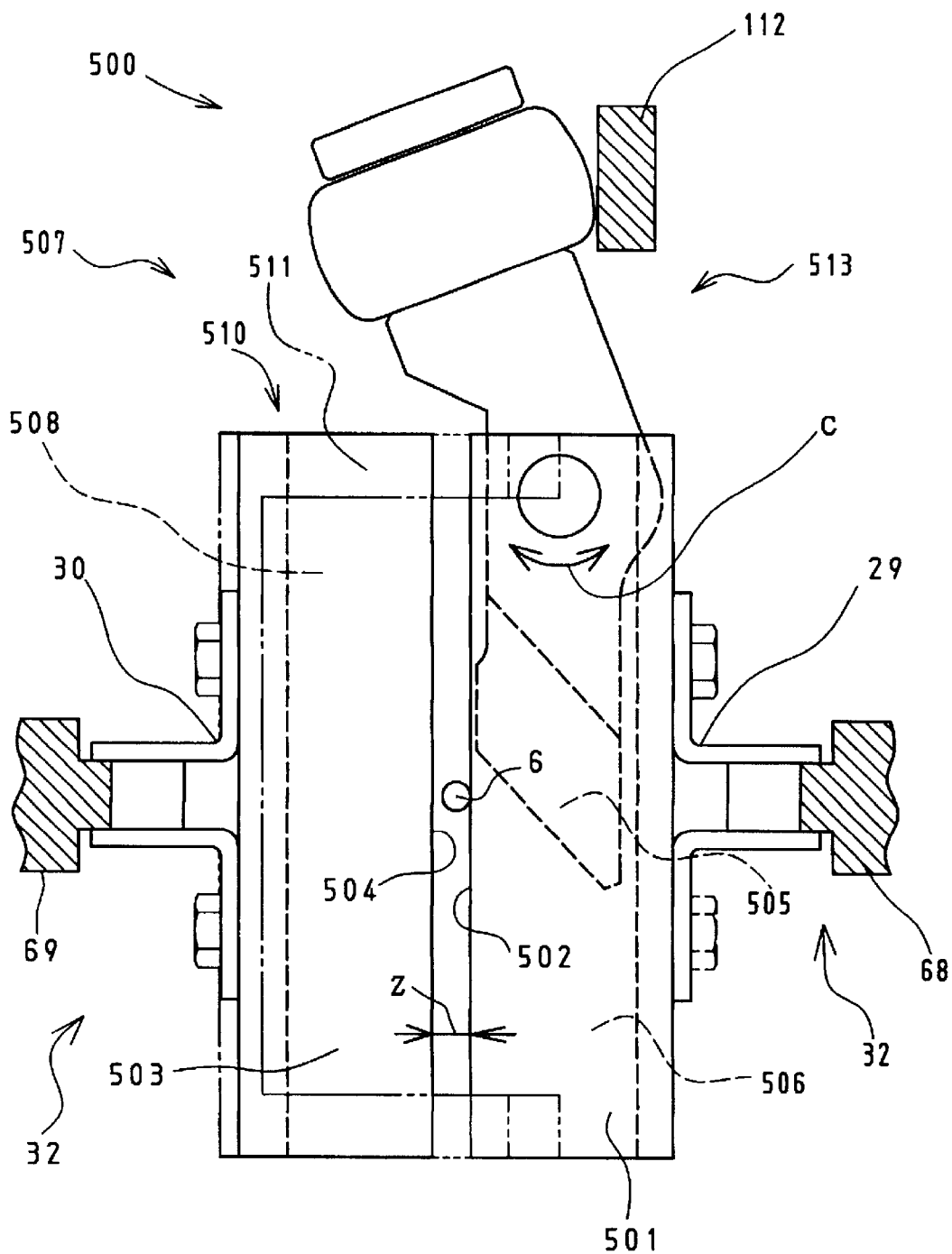
FIG. 18 is an explanatory side elevational view principally illustrating a stuffed-casing constriction-forming and conveying means in accordance with a further preferred embodiment of the invention.
Figure 19:
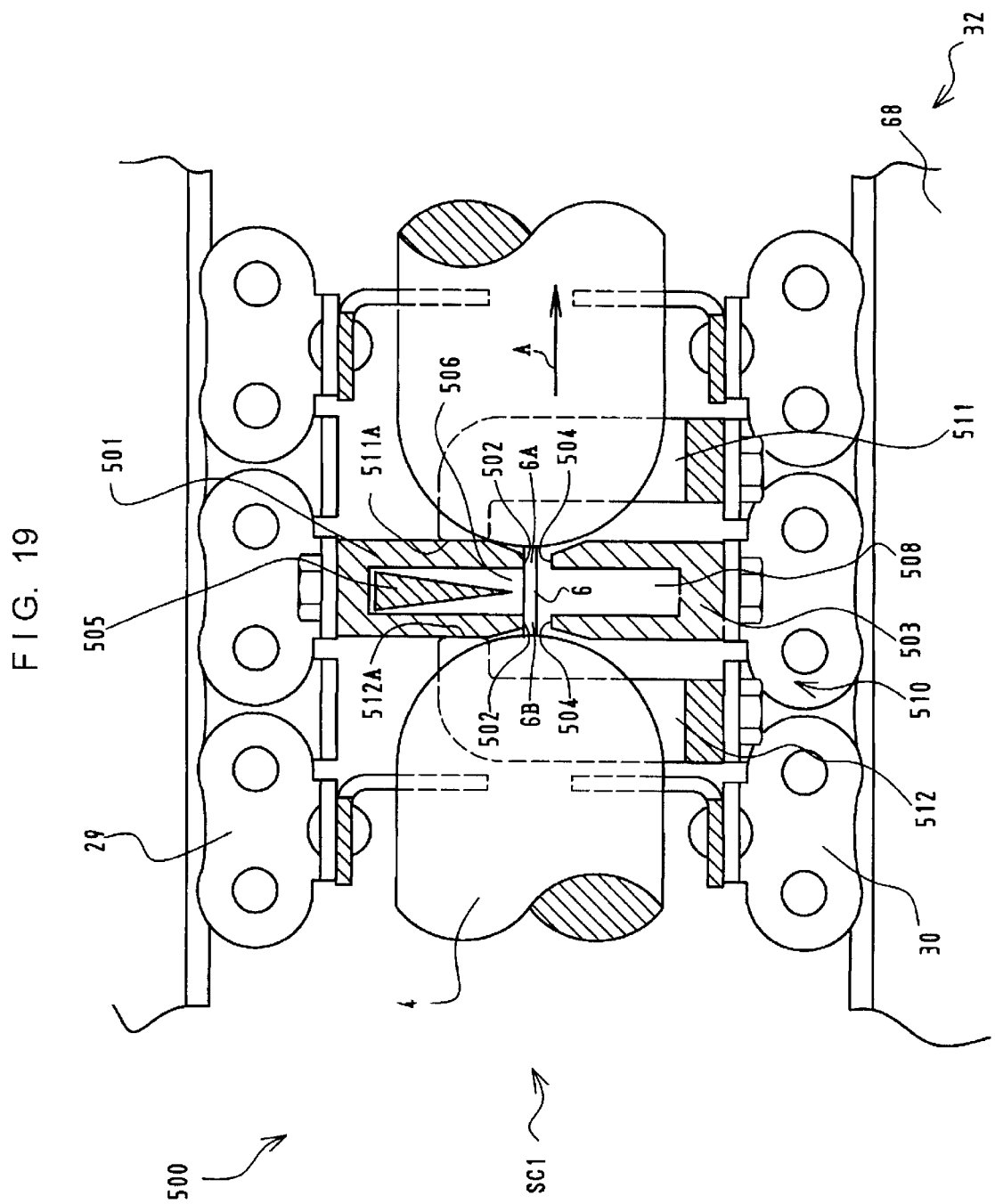
FIG. 19 is an explanatory plan view of the embodiment shown in FIG. 18.
Figure 20:
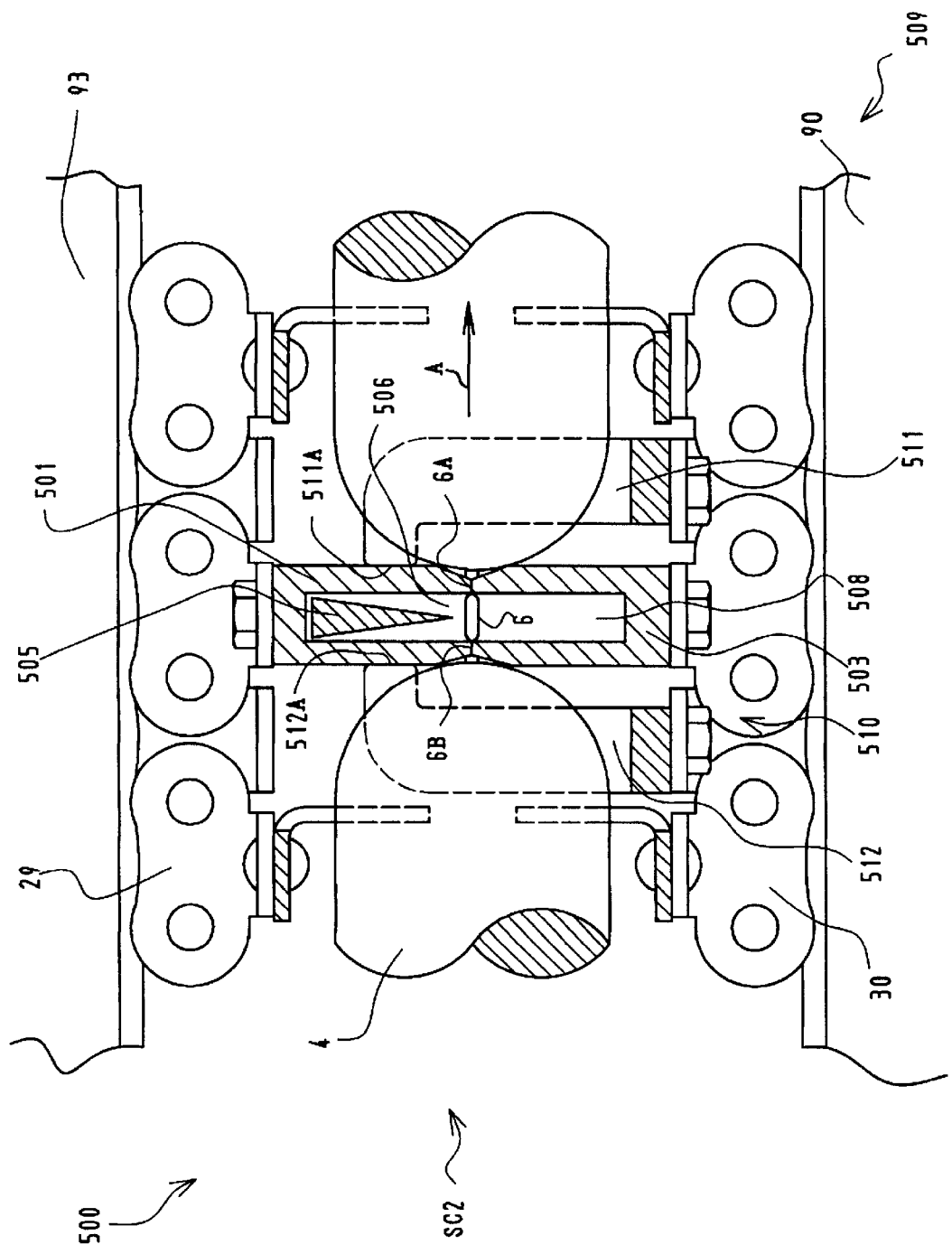
FIG. 20 is an explanatory plan view principally illustrating a surface pushing means and a pincher-members aligning means of the embodiment shown in FIG. 18.

The apparatus 500 for manufacturing foodstuffs such as sausages in this embodiment shown in FIGS. 18 to 20 is characterized in that pairs of pincher members are provided whose stuffed-casing squeezing surfaces for squeezing and constricting the stuffed casing are each formed in a planar shape, and in that the twisted portion is clamped by the pair of pincher members.

Referring also to FIGS. 1 to 17, the apparatus 500 is comprised of the stuffing tube 12, the stuffed-casing rotating means 14 having the speed means 201; a stuffed-casing constriction-forming and conveying means 507 for squeezing and constricting the rotating stuffed casing 4 at the predetermined intervals D to produce twisted portions 6 in the stuffed casing 4, and for conveying the stuffed casing 4; and cutting means 513 each having a cutting blade 505 for cutting the twisted portion 6. The stuffed-casing constriction-forming and conveying means 507 includes the pair of chains 29 and 30 for forming the conveying area SC for conveying the stuffed casing 4; pincher members 501 attached to the chain 29 at the predetermined intervals D and each having a pair of stuffed-casing squeezing surfaces 502 for squeezing and constricting the stuffed casing 4 and a slot 506 formed between the stuffed-casing squeezing surfaces 502 for the movement of the cutting blade 505; and pincher members 503 attached to the chain 30 at the predetermined intervals so as to be disposed at positions opposing the corresponding pincher members 501, and each having a pair of stuffed-casing squeezing surfaces 504 for squeezing and constricting the stuffed casing 4 and an escape slot 508 for the movement of the cutting blade. The stuffed-casing squeezing surfaces 502 and 504 are flat surfaces.

In the constriction-forming and conveying area SC1, the stuffed-casing squeezing surfaces 502 and the stuffed-casing squeezing surfaces 504 are opposed to each other with an interval Z between the opposing surfaces. Reference numeral 509 denotes a surface pushing means which is disposed in the cutting operation area SC2. The surface pushing means 509 has the pushing plate 90 for pushing the stuffed-casing squeezing surfaces 504 toward the stuffed-casing squeezing surfaces 502 to decrease the interval Z between the opposing surfaces, thereby allowing the twisted portion 6 at the two positions 6A and 6B to be clamped by the stuffed-casing squeezing surfaces 502 and the stuffed-casing squeezing surfaces 504.

Reference numeral 510 denotes a pincher-members aligning means which has aligning members 511 and 512. The aligning members 511 and 512 are provided adjacent to the pincher member 503 with the pincher member 503 placed therebetween, and are adapted to clamp through their mutual cooperation the pincher member 501, which is disposed in face-to-face relation to the pincher member 503, by means of their respectively formed clamping surfaces 511A and 512A. As a result, the positions of the pincher member 501 and the pincher member 503 in the conveying direction A are aligned.

The stuffed-casing squeezing surfaces 502 of the pincher member 501 and the stuffed-casing squeezing surfaces 504 of the pincher member 503 squeeze and constrict the stuffed casing 4 with the interval Z between the opposing surfaces, e.g., an interval of about 3 mm, in the constriction-forming and conveying area SC1, and reduce the interval Z of the opposing surfaces substantially to zero (the amount of thickness left after the clamping of the twisted portion 6; e.g., approx. 0.01 mm) in the cutting operation area SC2 so as to clamp the twisted portion 6 at the two positions 6A and 6B. By changing the interval Z between the opposing surfaces, the twisted portion 6 can be produced more reliably in the stuffed casing 4, and the twisted portion 6 can be cut more reliably without an error.

The apparatus 500 is able to form the twisted portion 6 having a required number of twists by changing the rotational speed of the stuffing tube 12, so that the cut sausages 121 become products in which the material 3 is not exposed at the twisted portions 6, and whose appearance is excellent.

In the apparatus 500, since the cutting blade 505 swings by projecting from the gap between the stuffed-casing squeezing surfaces 502 into the gap between the stuffed-casing squeezing surfaces 504 opposing to the stuffed-casing squeezing surfaces 502, the cutting blade 505 is able to traverse the entire transverse region of the twisted portion 6, thereby making it possible to cut the twisted portion 6 without an error. Since the motion of the cutting blade 505 is the swinging motion, high-speed operation of the cutting blade 505 becomes possible.

Figure 21:
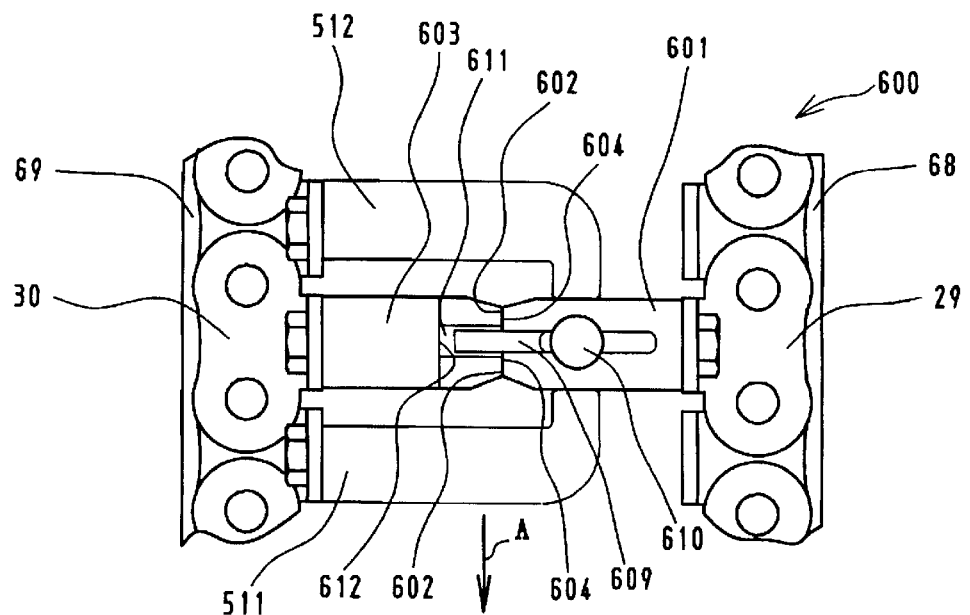
FIG. 21 is an explanatory plan view principally illustrating the stuffed-casing constriction-forming and conveying means and a cutting means in accordance with a still further preferred embodiment of the invention.
Figure 22:
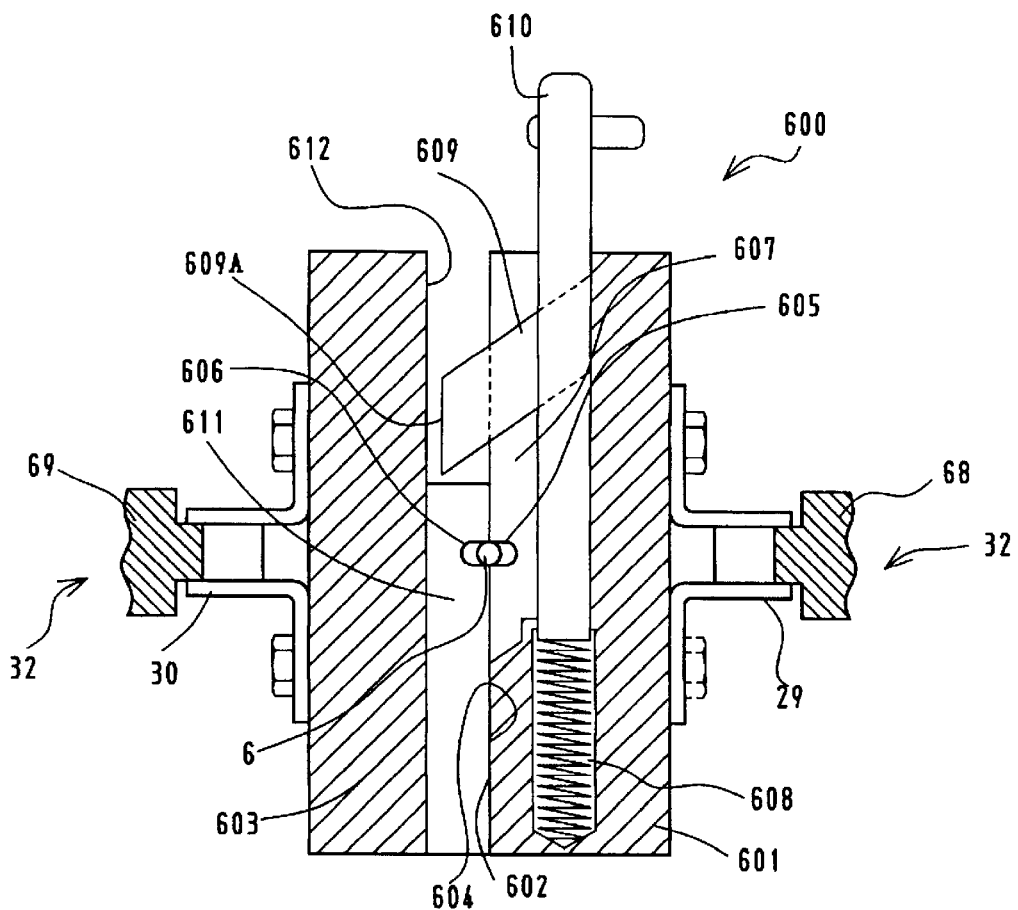
FIG. 22 is an explanatory side elevational view of the embodiment shown in FIG. 21.

Next, a description will be given of an apparatus 600 in accordance with a further embodiment of the invention. The apparatus 600 shown in FIGS. 21 and 22 is characterized in that the twisted portion 6 is not clamped by pincher members 601 and 603 during the cutting of the twisted portion 6, and that a cutting blade 609 is constantly located at a position in which it projects from a stuffed-casing squeezing surface 602. The pincher members 601 and 603 are pincher members respectively have stuffed-casing squeezing surfaces 602 and 604 which are flat. The pincher members 601 and 603 are respectively attached to the chains 29 and 30 such that the stuffed-casing squeezing surfaces 602 and 604 register while forming a gap therebetween or abutting against each other in the conveying area SC (the constriction-forming and conveying area SC1 and the cutting operation area SC2). In the case where the aforementioned gap is formed, the size of the gap is preferably about 0.5 mm in light of emphasis on the reliability of forming the twisted portion 6, and preferably 0 mm in light of emphasis on the reliability of cutting the twisted portion 6. The stuffed-casing squeezing surfaces 602 and 604 are respectively provided with notches 605 and 606 which accommodate the twisted portion 6 and extend in the conveying direction A with an inside diameter larger than the diameter of the twisted portion 6.

A groove 607 which is open at the stuffed-casing squeezing surface 602 and extends vertically and a hole 608 extending vertically are formed in the pincher member 601. The cutting blade 609 is secured to a plunger 610, and these two members are respectively accommodated slidably in the slot 607 and the hole 608. A side portion 609A of the cutting blade 609 is positioned in such a manner as to project from the opening in the stuffed-casing squeezing surface 602.

A vertically extending slot 611, which is open at the stuffed-casing squeezing surface 604, and a vertically extending notched portion 612 are formed in the pincher member 603, and are designed to allow the cutting blade 609 to be so positioned as to project into the pincher member 603 side. The cutting blade 609 is positioned in the notched portion 612 when it is not operated, and is positioned in the slot 611 when it is operated. The plunger 610 is adapted to be moved vertically by a known cam mechanism.

In the apparatus 600, since the twisted portion 6 is not subjected to the clamping action by the pincher members 601 and 603, the size of the twisted portion 6 does not decrease. Accordingly, even if the aforementioned gap is present between the stuffed-casing squeezing surfaces 602 and 604 during the cutting operation of the twisted portion 6, the escape of the twisted portion 6 to inside the gap is difficult to occur, so that the operation of cutting the twisted portion 6 is not hampered. It should be noted that, in this apparatus, the notch 606 may be omitted, and only the notch 605 may be used in the same way as the apparatus disclosed in U.S. Pat. No. 5,709,600.

In accordance with the present invention, it is possible to provide a method and an apparatus for manufacturing foodstuffs such as sausages which, even in the case of natural intestine sausages, make it possible to cut the twisted portions without an error, make it possible to accurately produce at a cutting position the twisted portions in which the stuffing material practically does not remain, and make it possible to form twisted portions in a desired number of twists, thereby making it possible to more reliably cut the twisted portions without an error.

What is claimed is:

1. An apparatus for manufacturing foodstuffs comprising:

stuffed-casing forming and rotating means for forming a stuffed casing and rotating the stuffed casing;

stuffed-casing constriction-forming and conveying means for forming a twisted portion in the stuffed casing by squeezing and constricting the stuffed casing being formed and rotated by said stuffed-casing forming and rotating means, stuffed-casing constriction-forming and conveying means having a conveying area for conveying the stuffed casing;

clamping means including a first clamping member and a second clamping member having at least two surfaces opposing each other at a predetermined interval therebetween with respect to a longitudinal axis of the twisted portion formed in the conveying area and adapted to clamp the twisted portion at at least a first position and a second position of the twisted portion by reducing the interval between said surfaces as the stuffed casing is conveyed, the first position being located in such a manner as to be spaced apart from the second position in a conveying direction; and cutting means for cutting the twisted portion located between the first position and the second position;

wherein said stuffed-casing constriction-forming and conveying means comprises:

squeezing means including a first pincher member and a second pincher member each having a squeezing surface to squeeze and constrict the stuffed casing;

a first endless member provided with the first pincher member;

a second endless member provided with the second pincher member so as to precede the second clamping member in the conveying direction; and circulatingly moving means for circulatingly moving the first endless member and the second endless member in synchronism with each other to circulatingly move the first pincher member and the second pincher member, wherein the first clamping member is provided on the first endless member; and the second clamping member is provided on the second endless member at upstream side of the second pincher member in the conveying direction adjacent to the second pincher member.

2. The apparatus for manufacturing foodstuffs according to claim 1, wherein said stuffed-casing forming and rotating means includes a stuffing tube, and stuffed-casing rotating means for rotating the stuffed casing and having speed means for rotating the stuffing tube while changing the rotational speed of the stuffing tube with at least two speeds including a minimum speed and a maximum speed in accordance with a cycle for forming the twisted portion in the stuffed casing.

3. The apparatus for manufacturing foodstuffs according to claim 1, wherein the first pincher member also serves as the first clamping member.

4. The apparatus for manufacturing foodstuffs according to claim 3, wherein the second clamping member has a projecting surface of a complementary shape for fitting in the recessed surface of the first pincher member, and said clamping means further includes face-to-face interval reducing means for reducing a face-to-face interval between the projecting surface of the second clamping member and the recessed surface of the first pincher member in the conveying area.

5. The apparatus for manufacturing foodstuffs according to claim 4, wherein said clamping means further includes aligning means for aligning the second clamping member and the first pincher member in the conveying direction, wherein said aligning means includes:

a first aligning member and a second aligning member both attached to the second endless member in a state in which the second clamping member attached to the second endless member is located therebetween; and clamping surfaces respectively formed on the first aligning member and the second aligning member and adapted to clamp in cooperation from both sides with respect to the conveying direction the first pincher member attached to the first endless member and disposed at a position opposing the clamping member.

6. The apparatus for manufacturing foodstuffs according to claim 5, wherein the first endless member and the second endless member are respectively constituted by a first chain and a second chain each having connected links, wherein the second chain has a first link to which the second clamping member is attached, a second link to which the first aligning member is attached and which adjacently precedes the first link, and a third link to which the second aligning member is attached and which adjacently follows the first link.

7. The apparatus for manufacturing foodstuffs according to claim 4, wherein said cutting means includes a swingable cutting blade and moving means for moving the cutting blade toward the clamping member, and said moving means has an arm member attached swingably to the first pincher member and guiding means for guiding the swinging motion of the arm member.

8. The apparatus for manufacturing foodstuffs according to claim 4, wherein the projecting surface of the second clamping member is formed by a projecting surface formed on a substantially trapezoidal projecting portion, and the projecting portion has an apex portion for being located inside the recessed portion of the first pincher member in the conveying area so as to clamp the twisted portion.

9. The apparatus for manufacturing foodstuffs according to claim 4, wherein said face-to-face interval reducing means has a plate for slidably guiding the second endless member toward the first endless member.

10. The apparatus for manufacturing foodstuffs according to claim 3, wherein the second pincher member is attached to a front surface, as viewed in the conveying direction, of the second clamping member.

11. The apparatus for manufacturing foodstuffs according to claim 3, wherein said stuffed-casing forming and rotating means has stuffed-casing rotating means for rotating the stuffed casing, said stuffed-casing rotating means has speed means for rotating the stuffing tube while changing the rotational speed of the stuffing tube with at least two speeds including a minimum speed and a maximum speed in accordance with a cycle for forming the twisted portion in the stuffed casing, and said speed means has a signal generating device for detecting the movement of the pincher member and outputting a signal for each unit amount of movement of the pincher member as well as controlling means for counting the signal received from said signal generating means and controlling the generation of the minimum speed and the maximum speed on the basis of a discrete value thereof.

12. An apparatus for manufacturing foodstuffs, comprising:
   stuffed-casing forming and rotating means for forming a stuffed casing and rotating the stuffed casing;
   a first endless member and a second endless member for forming a conveying area for conveying the stuffed casing;
   a pincher member attached to the first endless member and having a recessed surface;
   a clamping member attached to the second endless member and having a projecting surface which moves while being fitted in a recessed surface of the pincher member so as to produce in the conveying area an interval with the recessed surface of the pincher member:
      cutting means having a swingable cutting blade and moving means provided swingably on the pincher member and adapted to move the cutting blade toward the clamping member; and
      surface pushing means for relatively pushing out an apex portion of the projecting surface of the clamping member located inside the recessed surface with respect to the recessed surface of the pincher member located in the conveying area so as to reduce a face-to-face interval between the recessed surface and the apex portion of the projecting surface opposing and fitted in the recessed surface.

13. The apparatus for manufacturing foodstuffs according to claim 12, wherein said surface pushing means has a plate for slidably guiding the first endless member toward the second endless member.

14. The apparatus for manufacturing foodstuffs according to claim 12 or 13, wherein said surface pushing means has a plate for slidably guiding the second endless member toward the first endless member.

15. The apparatus for manufacturing foodstuffs according to claim 12, further comprising:
   aligning means for aligning positions in a conveying direction of the clamping member and the pincher member located in the conveying area
   wherein said aligning means includes:
      a first aligning member and a second aligning member both attached to the second endless member on both sides of the clamping member attached to the second endless member; and
      clamping surfaces respectively formed on the first aligning member and the second aligning member for clamping in cooperation from both sides with respect to the conveying direction the pincher member attached to the first endless member and disposed at a position opposing the clamping member.

16. A method of manufacturing foodstuffs, comprising the steps of:
   forming a stuffed casing and rotating the stuffed casing;
   squeezing and constricting the rotating stuffed casing by squeezing means and conveying the constricted stuffed casing by the squeezing means;
   while conveying the rotated stuffed casing, forming a twisted portion in the stuffed casing between surfaces of clamping means provided at an upstream side in a conveying direction adjacent to the squeezing means which has constricted the stuffed casing, said clamping means moving with the squeezing means, said surfaces of said clamping means opposing each other at a predetermined interval therebetween;
   while conveying the stuffed casing in which the twisted portion has been formed, clamping the formed twisted portion between the surfaces at least at a first position and a second position of the twisted portion located at upstream side of the squeezing means by reducing the interval between the opposing surfaces of the clamping means with respect to a longitudinal axis of the twisted portion, the first position being located in such a manner as to be spaced apart from the second position in the conveying direction; and
   cutting the twisted portion located between the first position and the second position.

17. The method of manufacturing foodstuffs according to claim 16, wherein the stuffed casing is rotated by a stuffing tube which rotates and whose rotational speed changes with at least two rotational speeds including a minimum speed and a maximum speed in accordance with a cycle for forming the twisted portion in the stuffed casing.

18. An apparatus for manufacturing foodstuffs comprising:
   stuffed-casing forming and rotating means for forming a stuffed casing and rotating the stuffed casing:
      a first endless member and a second endless member for forming a conveying area for conveying the stuffed casing;

a first pincher member attached to the first endless member and having a flat surface extending vertically straightly;

a second pincher member attached to the second endless member and having a flat surface extending vertically straightly, the second pincher member being adapted to move in such a manner as to oppose the first pincher member so as to form a face-to-face interval between the flat surface of the second pincher member and the flat surface of the first pincher member in the conveying area;

cutting means having a cutting blade and moving means for moving the cutting blade toward the second pincher member; and surface pushing means having a member adapted to relatively push out the flat surface of the second pincher member with respect to the flat surface of the first pincher member by slidably guiding either one of the first endless member and the second endless member in the conveying area so as to reduce a face-to-face interval between the opposing surfaces.

19. The apparatus for manufacturing foodstuffs according to claim 18 further comprising:

pincher-members aligning means for aligning positions in a conveying direction of the first pincher member and the second pincher member located in the conveying area, wherein said pincher-members aligning means includes:
a first aligning member and a second aligning member both attached to the second endless member on both sides of the second pincher member attached to the second endless member; and clamping surfaces respectively formed on the first aligning member and the second aligning member for clamping in cooperation from both sides with respect to the conveying direction the first pincher member attached to the first endless member and disposed at a position opposing the second pincher member.

20. An apparatus for manufacturing foodstuffs, comprising:

stuffed-casing forming and rotating means for forming a stuffed casing and rotating the stuffed casing;

stuffed-casing constriction-forming and conveying means for squeezing and constricting the rotating stuffed casing and forming twisted portions in the stuffed casing and for conveying the stuffed casing, said stuffed-casing constriction-forming and conveying means including a first endless member and a second endless member for forming a conveying area for conveying the stuffed casing, a first pincher member attached to the first endless member and having a stuffed-casing squeezing surface for squeezing and constricting the stuffed casing, and a second pincher member attached to the second endless member and having a stuffed-casing squeezing surface for abutting against and opposing the stuffed-casing squeezing surface of the first pincher member in the conveying area, a slot being formed in the stuffed-casing squeezing surface of at least one of the first pincher member and the second pincher member so as to allow the movement of the cutting blade for cutting the twisted portion;

cutting means for cutting the twisted portion and having a cutting blade positioned in such a manner as to project from the stuffed-casing squeezing surface toward the opposing stuffed-casing squeezing surface; and pincher-members aligning means for aligning positions in a conveying direction of the first pincher member and the second pincher member located in the conveying area, wherein said pincher-members aligning means includes:
a first aligning member and a second aligning member both attached to the second endless member on both sides of the second pincher member attached to the second endless member; and clamping surfaces respectively formed on the first aligning member and the second aligning member for clamping in cooperation from both sides with respect to the conveying direction the first pincher member attached to the first endless member and disposed at a position opposing the second pincher member.

21. An apparatus for manufacturing foodstuffs, comprising:

a stuffing tube over which a casing is fitted and through which a stuffing material is filled into the casing;

stuffed-casing rotating means adapted to rotate the stuffed casing by rotating the stuffing tube and having speed means for rotating the stuffing tube while changing the rotational speed of the stuffing tube with at least two speeds including a minimum speed and a maximum speed in accordance with a cycle for forming a twisted portion in the stuffed casing;

stuffed-casing constriction-forming and conveying means for squeezing and constricting the rotating stuffed casing and forming twisted portions in the stuffed casing and for conveying the stuffed casing, said stuffed-casing constriction-forming and conveying means including a first endless member and a second endless member for forming a conveying area for conveying the stuffed casing, a first pincher member attached to the first endless member and having a stuffed-casing squeezing surface for squeezing and constricting the stuffed casing, and a second pincher member attached to the second endless member and having a stuffed-casing squeezing surface for opposing the stuffed-casing squeezing surface of the first pincher member with a predetermined interval therebetween in the conveying area a slot being formed in the stuffed-casing squeezing surface of at least one of the first pincher member and the second pincher member so as to allow the movement of the cutting blade for cutting the twisted portion;

surface pushing means having a member adapted to relatively push out the squeezing surface of the second pincher member with respect to the squeezing surface of the first pincher member by slidably guiding either one of the first endless member and the second endless member in the conveying area so as to reduce a face-to-face interval between the opposing surfaces; and cutting means having a cutting blade for cutting the twisted portion.

22. The apparatus for manufacturing foodstuffs according to claim 21, each of the stuffed-casing squeezing surfaces is a flat surface extending straight in a vertical direction.

23. A method of manufacturing foodstuffs comprising the steps of:

forming a stuffed casing and rotating the stuffed casing;

moving a first endless member and a second endless member for forming a conveying are to convey the stuffed casing;

causing a recessed surface of a pincher member attached to the first endless member to be fitted to a projecting surface of a clamping member attached to the second endless member, and squeezing and constricting up to a predetermined interval the stuffed casing located between the recessed surface and the projecting surface;

forming a twisted portion in the constricted stuffed casing by rotating the constricted stuffed casing located between the recessed surface of the pincher member and the projecting surface of the clamping member opposing each other with the face-to-face interval in an upstream are of the conveying are;

reducing the face-to-face interval formed with respect to a longitudinal axis of the formed twisted portion between the recessed surface of the pincher member and the projecting surface of the clamping member which move from the upstream area of the conveying are toward a downstream area of the conveying are;

causing the recessed surface of the pincher member and an apex portion of the projecting surface of the clamping member lactated inside the recessed surface to clamp the twisted portion in cooperation with each other; and cutting in the downstream area of the conveying area an intermediate portion of the twisted portion being clamped by moving a swingable cutting blade provided on the pincher member toward a space between two clamping surfaces formed on the clamping member and spaced apart in a conveying direction.

* * * * *

UNITED STATES PATENT AND TRADEMARK OFFICE
CERTIFICATE OF CORRECTION

PATENT NO.    : 6,482,079 B1
DATED         : November 19, 2002
INVENTOR(S)   : Nakamura et al.

It is certified that error appears in the above-identified patent and that said Letters Patent is hereby corrected as shown below:

Column 17,
Line 58, change "member:" to -- member; --;

Column 18,
Line 16, change "area" to -- area, --;
Line 64, change "casing:" to -- casing; --;

Column 20,
Line 44, change "area" to -- area, --;
Line 66, change "are" to -- area --;
Line 67, change "casing:" to -- casing; --;

Column 21,
Line 13, change "are" to -- area -- (both occurrences);

Column 22,
Line 2, change "are" to -- area -- (both occurrences);
Line 5, change "lactated" to -- located --.

Signed and Sealed this

Eighth Day of April, 2003

JAMES E. ROGAN
*Director of the United States Patent and Trademark Office*